(12) United States Patent
Gilbert

(10) Patent No.: US 8,027,864 B2
(45) Date of Patent: Sep. 27, 2011

(54) SYSTEM AND METHOD FOR PROVIDING E-COMMERCE CONSUMER-BASED BEHAVIORAL TARGET MARKETING REPORTS

(75) Inventor: Sheldon Gilbert, New York, NY (US)

(73) Assignee: Proclivity Systems, Inc., New York, NY (US)

( * ) Notice: Subject to any disclaimer, the term of this patent is extended or adjusted under 35 U.S.C. 154(b) by 519 days.

(21) Appl. No.: 11/944,357

(22) Filed: Nov. 21, 2007

(65) Prior Publication Data

US 2008/0162574 A1     Jul. 3, 2008

Related U.S. Application Data

(60) Provisional application No. 60/860,560, filed on Nov. 22, 2006.

(51) Int. Cl.
*G06F 17/00*       (2006.01)
(52) U.S. Cl. .................................................... 705/7.31
(58) Field of Classification Search .................. 705/7.31
See application file for complete search history.

(56) References Cited

U.S. PATENT DOCUMENTS

| | | | |
|---|---|---|---|
| 7,680,685 B2 * | 3/2010 | Ouimet et al. | 705/10 |
| 2002/0042914 A1 | 4/2002 | Walker et al. | |
| 2005/0021397 A1 | 1/2005 | Cui et al. | |
| 2007/0239517 A1 * | 10/2007 | Chung et al. | 705/10 |

FOREIGN PATENT DOCUMENTS

WO    WO2004/111771 A2    12/2004

OTHER PUBLICATIONS

International Search Report and the Written Opinion of the International Searching Authority for PCT/US2007/85442 dated Mar. 25, 2008.

* cited by examiner

*Primary Examiner* — Thomas Dixon
(74) *Attorney, Agent, or Firm* — PCT Law Group, PLLC

(57) ABSTRACT

A system and methods which enable modeling of end consumer interests based on online activity and producing e-commerce reports is described. The method includes scoring and classifying interests and preferences of consumers in relation to various items being offered as function of time and utilizing such scores to predict purchasing activity and revenue yield for n-dimensional combinations of interest for generation of consumer lists for target marketing and merchandising. The method also includes converse modeling of the performance and behavioral profile of items offered as a function of consumer activity.

25 Claims, 29 Drawing Sheets

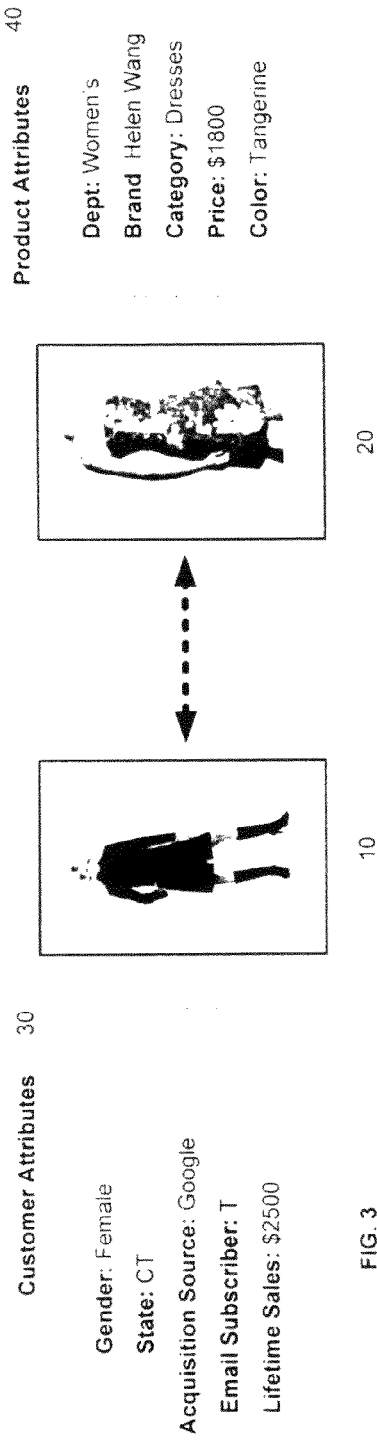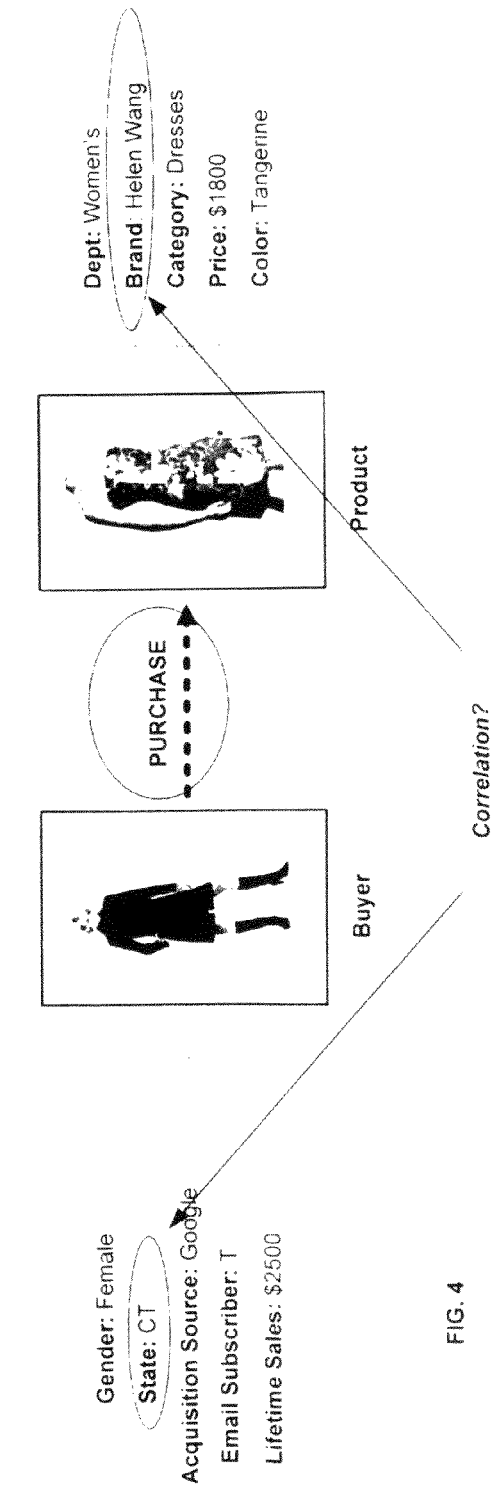
FIG. 3
FIG. 4

SYSTEM AND METHOD FOR PROVIDING E-COMMERCE CONSUMER-BASED BEHAVIORAL TARGET MARKETING REPORTS

CROSS REFERENCE TO RELATED APPLICATIONS

The present application claims priority to U.S. Provisional Application entitled "Analytical E-Commerce Processing System and Methods". Application Ser. No. 60/860,560, filed on Nov. 22, 2006, which is hereby incorporated by reference in its entirety. The present application is additionally related to two co-pending U.S. patent applications entitled "Analytical E-Commerce Processing System and Methods". Application Serial Numbers are pending. These applications claiming priority to the same provisional application and filed contemporaneously with the present application.

FIELD OF THE INVENTION

The present invention relates to consumer-based behavioral target marketing and merchandising in the context of item or product offerings in e-commerce.

BACKGROUND OF THE INVENTION

Offering relevant products is becoming increasingly important for e-commerce companies in order for them to effectively attract and retain consumers given the ever increasing number of competitors emerging on the Internet. As consumers are faced with an overwhelming selection of products, content, and/or service online, companies are faced with an equal level of decision complexity in order to effectively determine which of their ever expansive inventory of products should be offered to a consumer population the vast majority, of which are anonymous visitors of their online stores. This lack of visibility into the interests and shopping preferences of a large and often heterogeneous consumer base leads to suboptimal marketing and merchandising strategies as a result of undifferentiated product offerings.

The economic implications of non-relevant product offerings are quite considerable and could determine the long-term viability of present e-commerce companies engaged in a pernicious business cycle as they are forced to spend more on acquiring new customers in order to compensate for their turnover of the consumers that have previously visited and may have purchased within their online stores.

The standard approaches used by e-commerce companies to target customers is based on multivariate analysis, segmentation, and list generation of demographic and psychographic data, preference data provided during account registration online and/or historic purchase data of individual users in standard data-mart/data-warehouse environments. Each of these criteria presents significant limitations in enabling effective and scalable targeting of online consumers. First, demographic and psychographic data offers poor resolution into the nuanced interests of customers to specific products or product classes within a wide array of highly diversified inventories. In addition, only the disproportionately small population of consumers that have provided their identifiable address information (i.e., buyers, registrants/account holders, etc.) can be classified based on these criteria and thus targeted. The vast majority of online shoppers, who are anonymous visitors, simply can not be targeted.

Second, in the case of the use of interest or preference data explicitly provided by online consumers when they register or create accounts, such data is often sparse and unreliable in determining a customer's true shopping interests. It is usually non-reflective on what a particular customer has actually purchased, if they have purchased at all. This is similar in many ways to the demographic and psychographic data which has limited consumer reach and allows for targeting of disproportionately small populations.

Lastly, the third criteria for targeting consumers considered most effective by traditional brick-and-mortar companies and optimized, in particular, by retail catalog companies, is data on historic purchasing activity. While initial purchasing activity is an often effective determinant of future purchasing activity, it is dependent on the type of product being offered and their natural buying cycles (i.e., refrigerators and mortgage packages versus groceries and DVDs, etc.). Such factors determine the likelihood of repeat purchase rates. Response rates often drop precipitously on the second and future campaigns as natural buying thresholds have been exceeded.

Analysis of order data has been the mainstay of current database marketing/business intelligence technologies due in large part to its success in traditional catalog retail business models. When applied to e-commerce, the use of an order-centric data model, as typified in the canonical data warehouse star-schemas, presents significant limitations as an artifact of an old world brick-and-mortar paradigm. With point-of-sale systems such as cash registers as the primary transactional system of record, purchasing activity has been the central event space for analysis by commercial consumer oriented database systems offering a very myopic view of the breadth of important shopping dynamics that are occurring.

Despite the emergence of e-commerce and its vast new sources of transactional data, the capacity of e-commerce companies to effectively segment and target market and merchandise to their customers has remained a considerable challenge. Of the many reasons why efficient use of clickstream data has remained elusive for e-commerce companies, the most noteworthy data management and analytical limitations include: unwieldy volumes (terabytes) of raw transactional data requiring high storage and processing capacity, non-standardized data structures leading to limited semantic resolution and join complexity from modeling of multiple and heterogeneous event spaces due to dimensional non-conformity, and disproportionately small population of known consumers such as buyers and registrants, that are often considered more valuable to companies, whose clickstream data can actually be applied to them and be effectively leveraged to increase revenue and profits.

Many current solutions in the market have developed approaches to integrating voluminous clickstream data but still offer little to no improved ability to effectively target their consumers in order to increase revenues and profits. Many of the packaged data warehouse solutions, while integrating clickstream data, have architected the schema based on traditional approaches that make multivariate analysis across single or the desired multiple events inordinately processing intensive and often improbable to conduct. Given the cost of storing and processing terabytes of raw clickstream data, such packaged solutions are still oriented towards standard order-centric schemas and data architectures.

To fulfill this growing need to store and process terabytes of clickstream data in a cost-effective manner for e-commerce companies, web analytic service companies emerged. Many of these companies serve ostensibly as outsourced data warehouse solutions for e-commerce companies. Their technology services allow for the rapid processing of clickstream data in order to provide reports for aggregate traffic analysis, page performance, site usage, and conversion analysis.

Rarely can such patterns give insight into meaningful shopping patterns that can be readily attributed to individual or segments of customers for target marketing and merchandising.

Only recently, and in rare cases, are the client company's internal customer ids provided to such third party analytic services to allow for true onsite behavioral mapping and identification. The emergence of customer-level clickpath aggregation has led to new technologies in partnership with Email Service Providers whereby client companies can set up specific business rules to instantiate automated targeting events. The best known involves the use of trigger-based events where consumers that exhibit specified actions online (i.e., abandon item in shopping cart, download article, etc.) are sent a targeted email relating to the event in order to influence a desired activity such as a purchase or subscription.

Despite major advancements in processing power and storage capacity, most commerce analytic data systems (i.e., data warehouses, data marts, etc.) fail to provide companies with the ability to determine and launch high-performance campaigns by effectively determining what to offer their fickle and largely anonymous mass of customers as well as the means of targeting them in the rare occasions that their interests and preferences are determined. The analytic limitations of current direct marketing and merchandising technology solutions are the result of the continued use of an increasingly outdated commerce data model paradigm, inherent in brick-and-mortar systems, which are primarily designed to mine order-centric activity, albeit across a limitless set of dimensions.

Given the aforementioned, a need exists for decision support/revenue management system that effectively models the full breadth and depth of e-commerce data to enable companies to optimize servicing of their customers based on revenue projections of their differentiated shopping behaviors.

SUMMARY OF THE INVENTION

The present invention provides a system, methods, and computer program which enables users to model end consumer interests in items based on exhibited shopping activity online in order to predict purchasing patterns and revenue yield is described.

One embodiment provides a method that includes deriving a multi-dimensional, multi-resolutional, de-normalized interaction table and populating the table with information such as information on merchandise in the form of apparel, content, multi-media files, consumer goods, services, offerings and the like. One provided method then derives an e-commerce report from the table.

Another embodiment provides a computing apparatus including a processor, memory, and a storage medium. The storage medium contains a set of processor executable instructions that, when executed by the processor configure the computing apparatus to derive a multi-dimensional, multi-resolutional, de-normalized interaction table and populate the table with information such as, information on merchandise in the form of apparel, content, multi-media files, consumer goods, services, offerings and the like. One provided computing apparatus is configured by the instructions to derive an e-commerce report from the table.

A further embodiment of a provided computer software product includes a storage medium containing a set of processor executable instructions that, when executed by a processor, configure a computing apparatus to derive a multi-dimensional, multi-resolutional, de-normalized interaction table and populating the table with information such as information on merchandise in the form of apparel, content, multi-media files, consumer goods, services, offerings and the like. One provided software product further configures the computing apparatus to derive an e-commerce report from the table.

Another embodiment of a provided method includes modeling an aggregate set of affinity scores from a plurality of information such as information on products or services at varying resolutions, information on potential customers, and information on events at varying times. The method calculates a buying probability from at least one affinity score from the set, and then produces an e-commerce report from the buying probability.

Another embodiment of a provided computing apparatus includes a processor, a memory, and a storage medium. The storage medium contains a set of processor executable instructions that, when executed by a processor configure the computing apparatus to model a aggregate set of affinity scores from a plurality of information, the information may include, but is not limited to, information on products at various resolutions, information on potential customers, and information related to various events. The computing apparatus is further configured to calculate a buying probability from at least one of the affinity scores and produce an e-commerce report from the affinity scores.

A still further embodiment of a provided computer software product includes a computer readable medium containing a set of processor executable instructions that, when executed by a processor configure the computing apparatus to model a aggregate set of affinity scores from a plurality of information, the information may include but is not limited to information on products at various resolutions, information on potential customers, and information related to various events. The computing apparatus is further configured to calculate a buying probability from at least one of the affinity scores and produce an e-commerce report from the affinity scores.

Further embodiments provide methods, computing apparatus and software products for implicitly scoring and classifying the interests and preferences of consumers in relation to various dimensions of items being offered (i.e., products, content, service packages, etc.) as function of time and utilizing such scores to predict purchasing activity and forecast revenue yield for n-dimensional combinations of interest for optimal generation of consumer lists for target marketing and merchandising. The method may also include converse modeling of the performance and behavioral profile of items offered as a function of consumer activity.

According to aspects of the present invention, a database schema for implicitly determining the interests of customers and predicting their buying patterns and revenue yield for various aspects of specified items with which they have interacted online, is disclosed.

BRIEF DESCRIPTION OF THE DRAWINGS

Various embodiments of the present invention taught herein are illustrated by way of example, and not by way of limitation, in the figures of the accompanying drawings, in which:

FIG. 3 is an illustration of customer and product attribute data model consistent with one embodiment of the present invention;

FIG. 4 is an illustration of potential targeting model consistent with one embodiment of the present invention;

Figure 1:
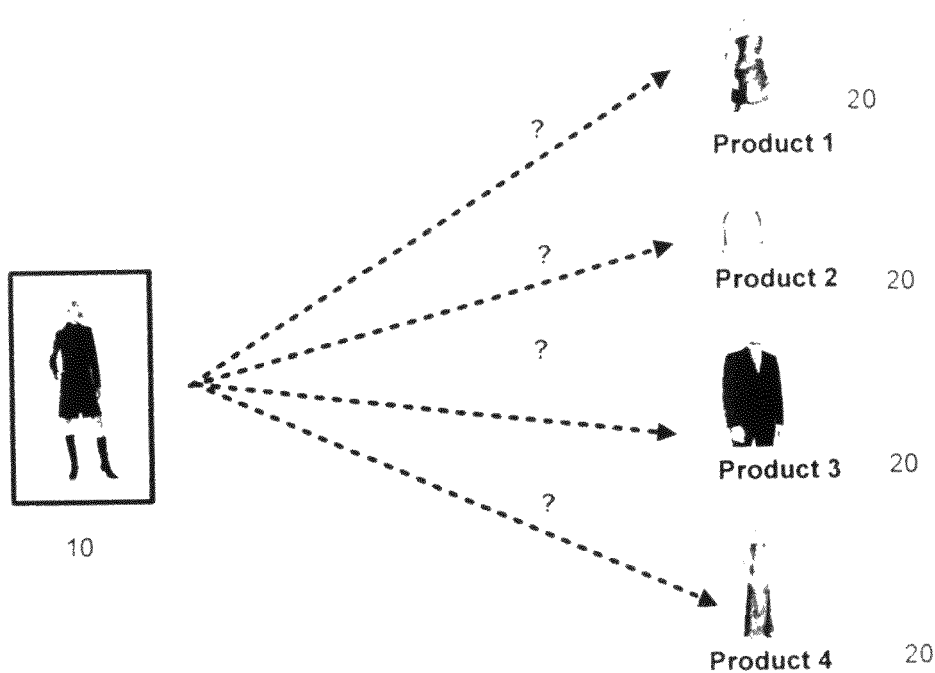
FIG. 1 is an illustration of a customer-centric targeting system consistent with one embodiment of the present invention.

It will be recognized that some or all of the Figures are schematic representations for purposes of illustration and do not necessarily depict the actual relative sizes or locations of the elements shown. The Figures are provided for the purpose of illustrating one or more embodiments of the invention with the explicit understanding that they will not be used to limit the scope or the meaning of the claims.

DETAILED DESCRIPTION OF THE INVENTION

In the following paragraphs, the present invention will be described in detail by way of example with reference to the attached drawings. While this invention is capable of embodiment in many different forms, there is shown in the drawings and will herein be described in detail specific embodiments, with the understanding that the present disclosure is to be considered as an example of the principles of the invention and not intended to limit the invention to the specific embodiments shown and described. That is, throughout this description, the embodiments and examples shown should be considered as exemplars, rather than as limitations on the present invention. Descriptions of well known components, methods and/or processing techniques are omitted so as to not unnecessarily obscure the invention. As used herein, the "present invention" refers to any one of the embodiments of the invention described herein, and any equivalents. Furthermore, reference to various feature(s) of the "present invention" throughout this document does not mean that all claimed embodiments or methods must include the referenced feature(s).

Online commerce presents a unique set of marketing difficulties and opportunities that are not usually present in the traditional "brick-and-mortar" commercial operation. In an online environment users may typically be relatively anonymous and very little demographic information may be known about the user. The users, or potential customers, may browse the site from a wide range of geographical places. Typical use data collection methods can result in very large data sets that present significant difficulties in categorizing and processing meaningful information from the collected data.

Despite major advancements in processing power and storage capacity, most commerce analytic data systems (i.e., data warehouses, data marts, etc.) fail to provide companies with the ability to determine and launch high-performance campaigns by effectively determining what to offer their fickle and largely anonymous mass of customers, as well as the means of targeting them in the rare occasions that their interests and preferences are determined. The analytic limitations of current direct marketing and merchandising technology solutions are the result of the continued use of an increasingly outdated commerce data model paradigm, inherent in brickand-mortar systems, which are primarily designed to mine order-centric activity, albeit across a limitless set of dimensions.

A significant key to unlocking economic benefits of personalization and target marketing lies beyond improvements in data storage capacity and/or expedient data processing technologies. Instead, as evidenced by the new data modeling approach consistent with a method provided, the ability to significantly increase purchasing activity requires fundamental shifts in the criteria (attributes/dimension) that companies use to target their customers. Various embodiments of the present invention provide methods of behavioral targeting of potential customers through an analytical e-commerce engine.

Utilizing various embodiments of the methods provided an online store can unleash the major revenue-generating potential of increasing order conversion rates by significantly increasing the target population of customers based on their interests out of the massive untapped market of "shoppers", the vast majority of which have never bought. One method provided herein, may calculate the dynamic "interests" of ever-shifting customers based on their "interaction" with equally dynamic merchandise or content.

The expansion of the event space between the product, customer, and time dimension to include a broad set of distinct shopping events (represented as fact tables) beyond the standard order-event, is a central aspect of the advanced capabilities of various provided embodiments. By prior semantic enrichment and assembly of distinctive shopping events found in raw clickstream data into a unified shopping behavioral ontology, a single multi-event "intelligent" fact table may be created that can enable new and significantly faster calculations of customers' interests across numerous dimensions. Potential customers future purchasing activity may be modeled advertising campaign revenue potential calculated, and e-commerce reports such as target advertising list may be immediately generated for such campaigns.

In one embodiment, a system is configured to determine the interests of potential customers by calculating their interests and/or preferences scores in relation to its merchandise set through high throughput multidimensional modeling of their historic clickstream activity. The system may then use these dynamic and adaptive customer interest scores for advanced behavior-based segmentation. The segmentation may be used to create predictive parameters to forecast buying probabilities of a particular product. Additionally, the disclosed methods may calculate the likely sales performance of a nearly limitless set of possible targeting/personalization advertising campaigns with the application of Hierarchical Bayesian techniques. Given the immense predictive capacity of these novel multidimensional interest scores, the system immediately helps business users develop the most profitable campaigns, by identifying and generating optimal target populations (customer lists) of high-performing prospects. In one embodiment a specialized GUI may allow a user to configure an ad campaign from the data models.

The multidimensional nature provided by various embodiments, allows uniquely powerful analytic flexibility in terms of generating e-commerce reports, such as advertising campaigns and promotions from two major business exploratory modalities:

1. Product-centric modality: determination of which customer (group of customers) should be targeted with a known product (group of products).
2. Customer-centric modality: determination of what product (group of products) to offer a known customer (group of customers).

Often in the case of the business user (merchandiser) that has a particular product or conceptual classification of products in mind that they are looking to sell (i.e., sku, Brand, Category, Dresses over $300, Brown shoes in size 4 on sale last week, for example), the system can be used to determine who the best prospects are for selective targeting at various levels of interest for the option of further micro-segmentation.

In the case of the business user (marketer) a provided software product can be used to determine what the most appealing products or sets of products are for selective targeting at various levels of interest for the option of further micro-segmentation. This allows a select segment of customers or conceptual classification of customers (i.e., New Customers, Holiday Visitors that never bought, Price-Insensitive Shoe Buyers, Weekend Shoppers, etc.) to be targeted with advertising customized to their preferences. Thus by targeting customers based on their interest level, a much wider audience of prospects is automatically generated which leads to significantly higher conversion and sales.

One objective of a system configured consistent with embodiments of the present invention is to increase order conversion rates and profit margins of marketing campaigns and promotions by determining the right products to offer to the right customers at the right time. The methods provided by various embodiments of the present invention were developed for use a myriad of enterprise systems as well as across various domains and sectors such as retail, travel, literature and publishing, finance, politics, and education to name a few.

One feature of a method provided herein is that it capitalizes on the relationship between two entities, customers and products, and some event between them, most often, a purchase. While business users typically do not consider these two entities in strong relation to each other, given the commonplace vertical silos of marketing and merchandising departments within retail companies, a stringent understanding of the relationship between the two is critical to optimizing sales and is thus at the center of the method's capability.

Figure 2:
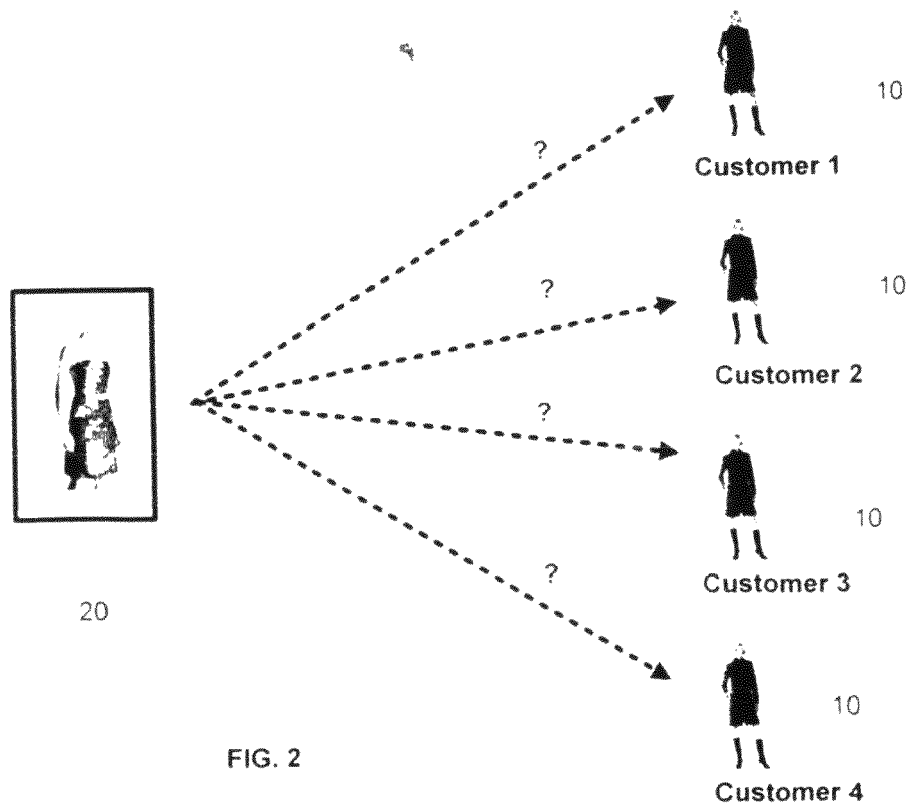
FIG. 2 is an illustration of a product-centric targeting system consistent with one embodiment of the present invention.

One embodiment of a method addresses both customer-centric targeting aspects, illustrated in FIG. 1, and product-centric targeting, illustrated in FIG. 2. In the customer-centric model, a customer 10 is related to a plurality of products 20. As used herein "product" or "merchandize" may comprise tangible products such as clothing, intangible products such as multi-media files, and services. The product-centric targeting illustrated in FIG. 2 relates a specific product 20 to a plurality of customers 10. A central challenge, and thus opportunity, facing all retail businesses is trying determine the profitable circumstances for which products should be to offered to customers and which customers to offer them to. A customer-centric model seeks to determine which products, and or services to offer customers. A product-centric model seeks to determine which potential customer should be target with which range of products.

As illustrated in FIG. 3, an embodiment of the present invention takes advantage of the understanding various customer attributes 30, such as place of residence, age, gender, interests, spending habits, etc., may improve the determination of what should be offered and thus what he/she is likely to purchase. Similarly, an improved understanding of product attributes 40 such as price, color, size range, brand, category, shelf-speed, rate to clearance, etc., informs the decision of the conditions under which it should be sold and likely to whom in order to maximize the possibility of a sale. As illustrated, many of these attributes are at resolutions that differ from one another. For example, price may be in dollars while shelf-speed may be expressed in days, weeks, or other time periods.

Figure 5:
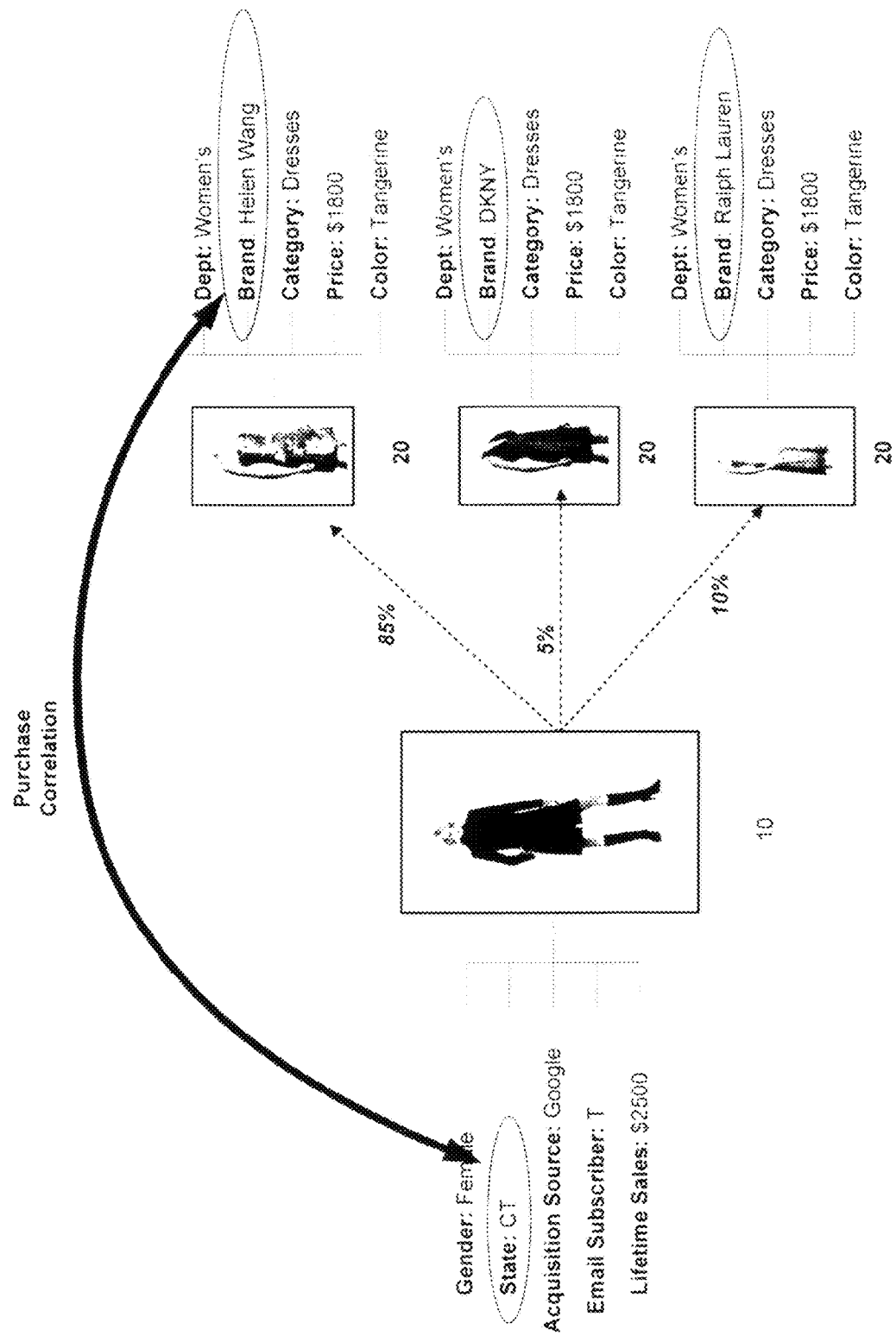
FIG. 5 is an illustration of an established targeting model consistent with one embodiment of the present invention.

Consistent with aspects of the present invention, improvements in selling dynamics are provided from differentiation in the attributes amongst customers and establishing correlations with potential differentiation within products. The importance of such attribute correlation patterns, is exemplified in the most basic retail business models. These are often typified by the knowledge and the ability to immediately capitalize on such knowledge by the local storekeeper. The storekeeper's inferred determination of the various preferences and interests of customers to the qualities/characteristics of products based on observed transactions can be used to optimize sales. In essence, the storekeeper, can establish important relationships between various segments of customers with various segments of products based on implicit correlations amongst their respective sets of attributes based on specific types of transactions. As demonstrated by FIG. 4 and FIG. 5, specific relationships can be observed between customer attributes 30 and product attributes 40 within a particular event space. The event space can include purchase related transactions, and provide the basic framework for a potential marketing model. For example, if there is a purchase correlation between the State and Brand attributes of the customer and product, where customers from Connecticut may have a significant proclivity to buy Helen Wang. See FIG. 5.

The efficacy of customer attribute 30 and product attribute 40 data in driving one-to-one or targeted marketing, can prove increasingly difficult when dealing with the enormous scale of e-commerce. In most e-commerce environments, many of the millions of customers 10 may remain anonymous. These individuals are constantly choosing from an equally expansive breadth of products 20 being offered under a wide array of purchasing dynamic options. As such, increased emphasis has been placed on developing techniques that allow companies to improve sales and profits by effectively targeting their customers with the products and/or services which they are most interested in and thus likely to purchase. One feature of various embodiments is that they provide methods of correlating these attributes.

In the early phase of e-commerce this notion of one-to-one individualized marketing and personalized merchandising seemed increasingly likely due to the ubiquity of transactional and consumer data, in particular, data being collected about all of the pages on websites that users were continuously clicking on and viewing. Known otherwise as click-stream data, this data is generated by webservers about a user's browsing activity. Clickstream data can provide immediate insight into aggregate traffic activity to see which areas of the website are being most visited and/or under utilized. The present invention provides more advanced applications of clickstream data by processing it and associating it with individual customers and their preferences thus providing powerful personalized marketing opportunities that lead to individualized or segment-targeted email campaigns or versions of the website.

Figure 6:
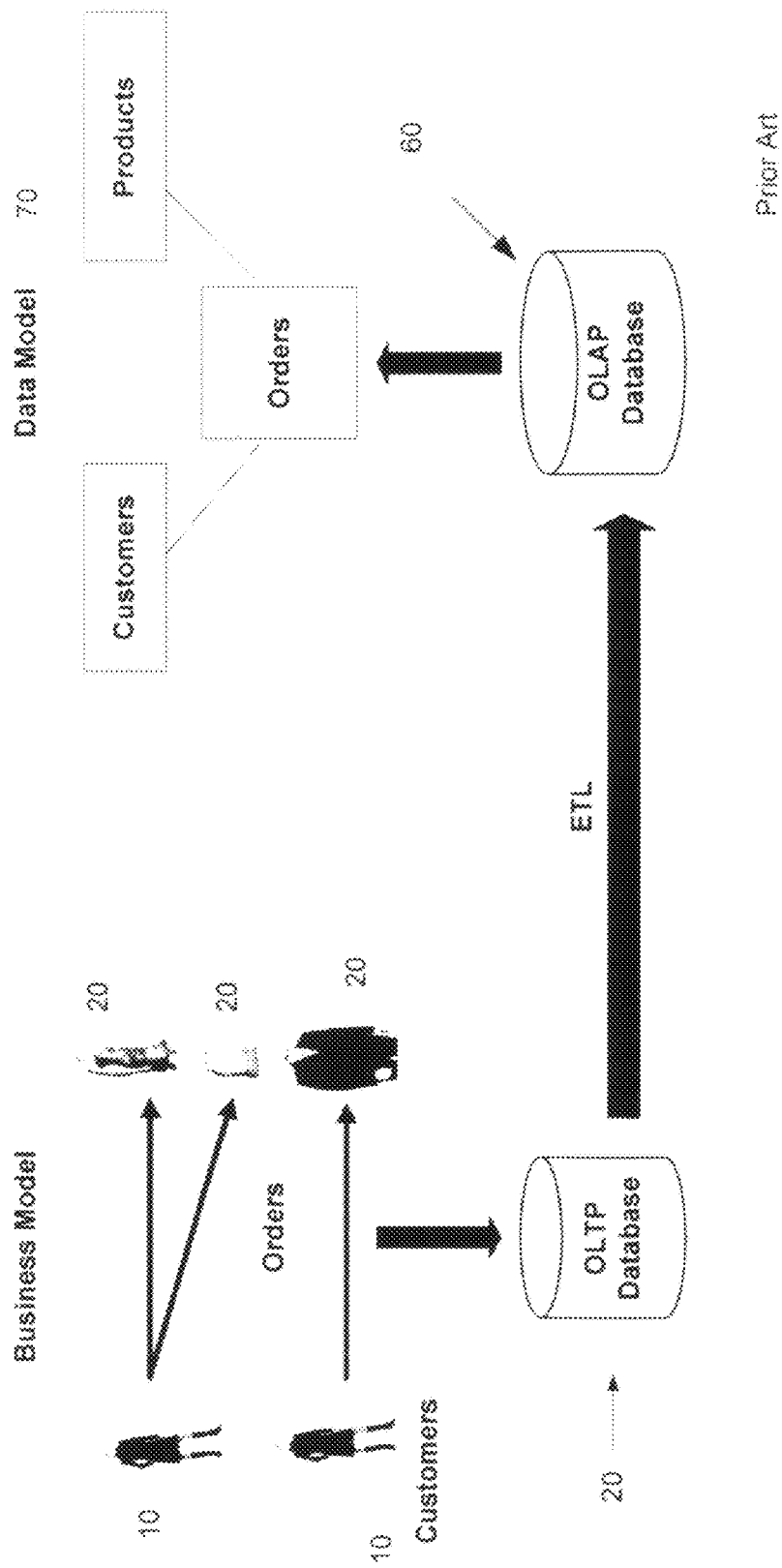
FIG. 6 is an illustration of a standard commerce analytic data model.

Despite the significant investments in technical solutions, the promise of personalization has never been realized. Significant advancements have been made in the collection, storage, and, in certain ways, application of advanced statistical data mining techniques to increase the yield of potentially beneficial models. The limited success of these first-generation personalization technologies, may have been dependent on a major oversight in the assembly and architecture of the underlying data in these analytic database systems. In short, the current data model, illustrated in FIG. 6, prevalent in nearly all commercial analytic database applications, has become largely obsolete as an anachronism of the order-centric world of traditional brick-and-mortar commerce for which it was designed.

As illustrated above in FIG. 6, the data architected and modeled is a reflection of the business model often inheriting all of the important nuances and caveats of the transactional dynamics. In this illustration, transactions such as orders, may be stored in "Online Transaction Processing" (OLTP) database 50 and data models 70 may be stored in an "Online Analytical Processing" (OLAP) database 60. These dynamics include pricing promotions and seasonal sales strategies in the case of well designed analytic data models.

Figure 7:
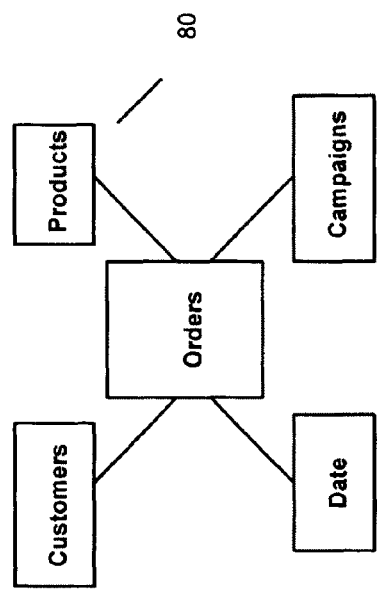
FIG. 7 is an illustration of a standard multidimensional commerce analytic data model consistent with one embodiment of the present invention.

In its most basic formulation, the data model 70, illustrated in FIG. 7, represents the relationship between different entities that can be represented as dimensional tables within specific event spaces or actions typically represented as fact tables. Thus, the central event in commerce being the Order, all aspects/dimensions of this event's occurrence are incorporated into the model for analysis. In addition, other important dimensions such a Time/Date, Promotion/Campaign, etc. are often included as part of the standard commerce data model 70. The inclusion of numerous dimensional tables with their own extensive set of attributes/dimensions in a star-schema data model 80 allows for the expedient exploratory analysis across a massive array of various n-dimensional combinations across specific events.

The star-schema data model 80, illustrated in FIG. 7, has proven invaluable in the wide-scale commercial application of data warehouse and data mart technologies that are reliant on the intelligent aggregation of key commerce metrics such as sales, profits, gross margin, volume, average order size, and the like, across a number of dimensional combinations across customer groups, product types, seasonality and time, and strategic campaigns and promotions to produce valuable and mission-critical information in a rapid time frame. While its denormalized architecture leads to significant storage costs, this facet is what allows OLAP databases 60 to produce rapid results with minimal joins across extremely large historical tables of data.

In contrast, standard commercial OLTP systems are usually characterized by a large number of relatively simple queries on a reduced data set. Typical OLAP architectures apply complex transformation rules on voluminous amount of data. OLAP tools may have different database architectures (Relational OLAP, Multi-dimensional OLAP, . . . ) for storing information. As well OLAP access may be performed through different types of data architecture distribution (i.e., centralized OLAP database or distributed OLAP databases). Clickstream database systems additionally provide such transactional data which may include purchasing data and in the case of the latter high volumes of page view activity. The dimensional data pertains to the attributes of a given event such as the consumer, item, and time at which it occurred. Such data can be found in OLTP and OLAP data systems.

Figure 8:
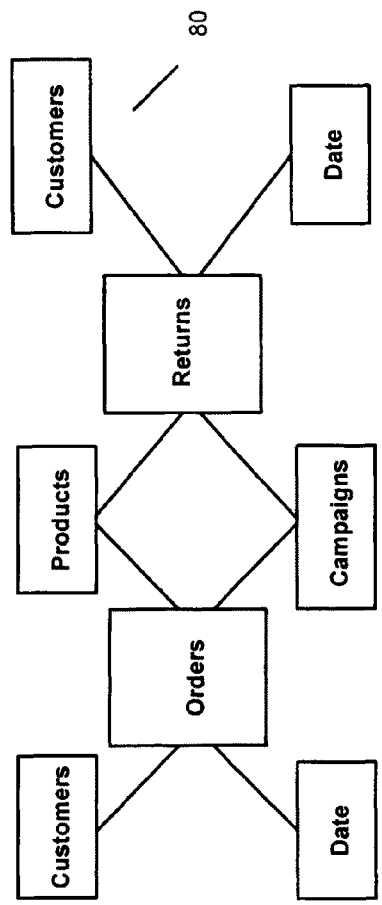
FIG. 8 is an illustration of a multi-event commerce data model consistent with one embodiment of the present invention.

Often, as illustrated in FIG. 8, companies will often extend the star-schema data model 80 to incorporate additional critical entities and types of events that reflect the complexities of their own business model in order to uncover important dynamics to drive sales and profits. The inclusion of additional tables, while certainly causing performance hits due to increased storage and processing time through increased data normalization, provide immense economic benefits that far outweigh these technical costs.

One advantage of methods of the present invention lies in their ability to incorporate additional events and dimensions to provide even greater analytical insight through increased resolution of transactional activity to yield potentially important patterns. Many of these events may be present in clickstream while others may be derived events. Given this immensely flexible assembly of dimensions within specific event spaces at even the lowest granularity of raw atomic data, advanced data mining techniques may be employed. These techniques include but are not limited to cluster analysis, logistic regression, association rule mining, Naïve Bayesian analysis, can be readily applied to such data architectures to generate some valuable findings. The novel methods described herein allow for a fundamental re-architecture and remodeling of the standard commerce data model to include a specialized fact table and augmented dimensions to create an advanced high-performance system for target marketing and merchandising.

In contrast, the current order-centric star schema data model 80, illustrated in FIG. 7, is an artifact of the brick-and-mortar business model from which it was originally designed to represent and help optimize. Given that traditional offline business models only had the cash register as the sole POS transactional system of record for customer activity based on orders. The order event became the central commerce event of focus. Nearly all commerce metrics were based on aspects of sales and profits due to orders and shipments. As a result, nearly all of the attributes of the customer, as well as the product, were based on sales. For a considerable amount of time, demographic/psychographic and non-purchase transactional data were ignored. Examples of demographic/psychographic data may include residence state, zip code, gender, age, and household income. Examples of non-purchase transactional data may include Recency-Frequency-Monetary (RFM) scores, customer Long-Term-Value (LTV) scores, and credit card used. In various embodiments of the methods provided herein, the use of such attributes and events, whether explicitly gathered or statistically derived, increases sales in the e-commerce world.

Figure 10:
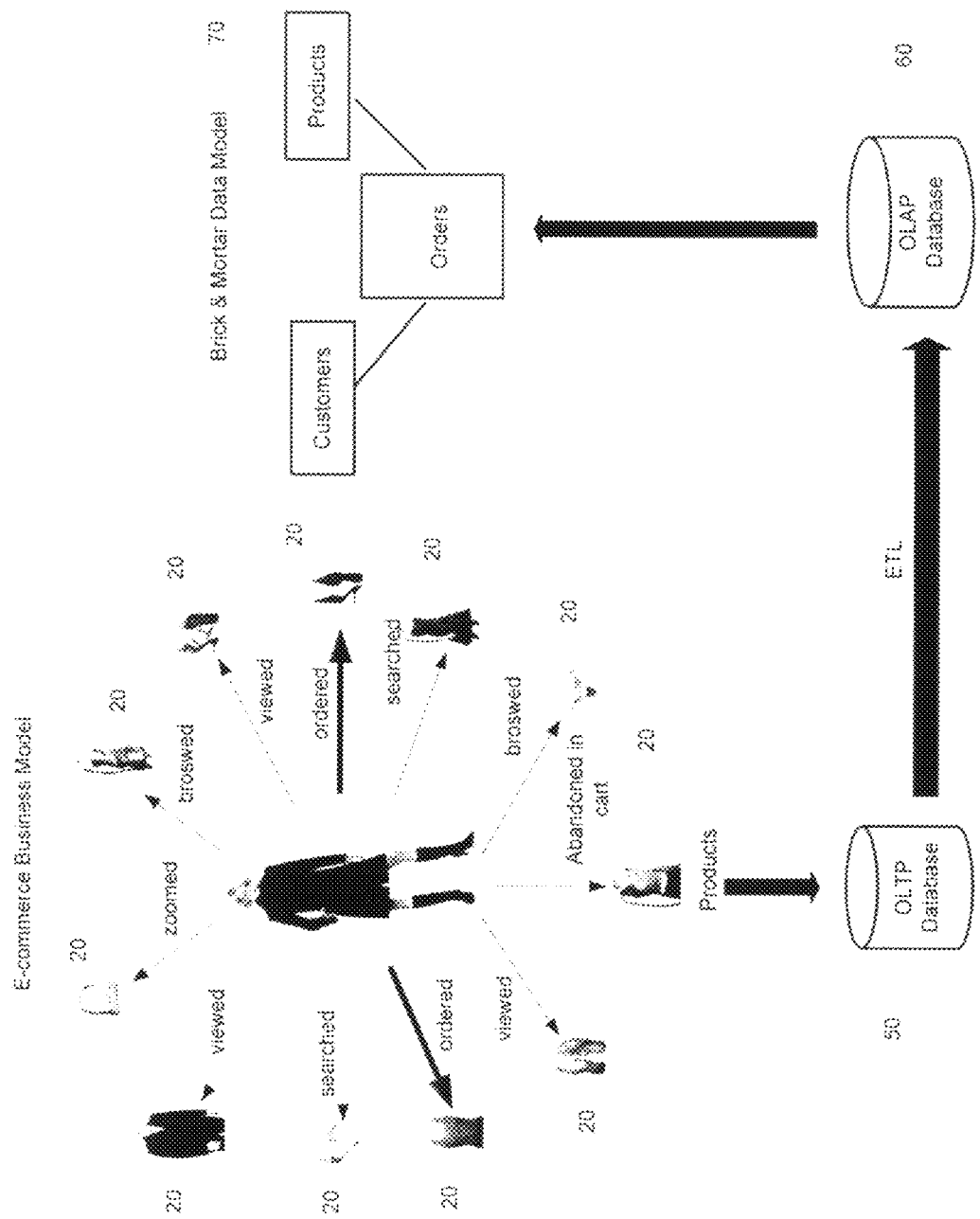
FIG. 10 is an illustration of the limitations of current commerce data model consistent with one embodiment of the present invention.

The e-commerce data model, illustrated in FIG. 10, is a radical departure from the brick-and-mortar paradigm, and yet nearly all retail data analytic systems do not use a central data model that reflects this fundamental change. It is far more dynamic in terms of the sheer scale of transactional activity executed by an exponentially growing consumer base that is continuously browsing, viewing, cart inserting, abandoning, searching, zooming, price comparing, reading, purchasing, gift wrapping, emailing, and shipping an equally vast array of products.

To meet the need to process and store such unprecedented volumes of rich transactional data, such as, clickstream data, companies invested in a host of new technologies and systems that collect and store larger amounts of data. Much of this focused on the development of powerful new Relational Data Base Management Systems (RDMS) that could better manage and expediently process such large volumes of data with improved query response times through improved indexing, partitioning, and aggregation strategies. This also led to the emergence of powerful and highly integrated new Decision Support Systems (DSS) software applications that combined high performance data warehouse systems (in various OLAP modalities) with new commerce application servers. This combination allowed email deployment and campaign management systems to create unified view of the customer across an entire enterprise designed to meet the needs of a growing tide of customers navigating in a new market of infinite choices.

Yet despite the advancements in the volume and richness of data related the page-clicking activity of every online browser and the investment in technologies to mine such data, newer more powerful and nuanced criteria to target customers based on their online activity, have yet to be fully developed and capitalized upon.

Presumably much of this investment in commercial data processing systems for the new economy has failed to address a fundamental aspect of the data itself and how it is assembled. In an area where rapid provision of critical information is important, the current order-centric data model, has become a rate limiting step in unlocking the true economic possibilities of personalization technology. This is due in part to its failure as it fails to easily incorporate and expediently process magnitudes more immensely valuable online transactional data (fact-based event data) in addition to order events such as category browsing, product viewing, cart insertion, and searching events. It is a silent culprit that fundamentally precludes the mining and effective use of inordinately richer sets of data leaving millions in unrealized revenues every day.

There are number of reasons why the use of demographic/psychographic and order-centric customer attributes are severely limited in driving sales in the e-commerce model, there are three factors of particular importance. The first, often described as a cold-start dilemma is an increased scarcity of buyers to which such demographic/psychographic and order-centric attributes can be applied for targeting. The massive explosion of online visitors has essentially diluted the use of otherwise valuable demographic/psychographic and order-centric attributes. Only a very small population of online visitors are identifiable and have ever made a purchase thus making such attributes increasingly obsolete as targeting modalities. Thus the vast majority of customers which are unknown will not have such attributes available for targeting. In addition, the corollary cold-start dilemma also emerges with regards to products as the only a few products have been purchased and thus effectively offered to an equally small group of customers that have actually purchased or for which demographic/psychographic data is available.

Figure 9:
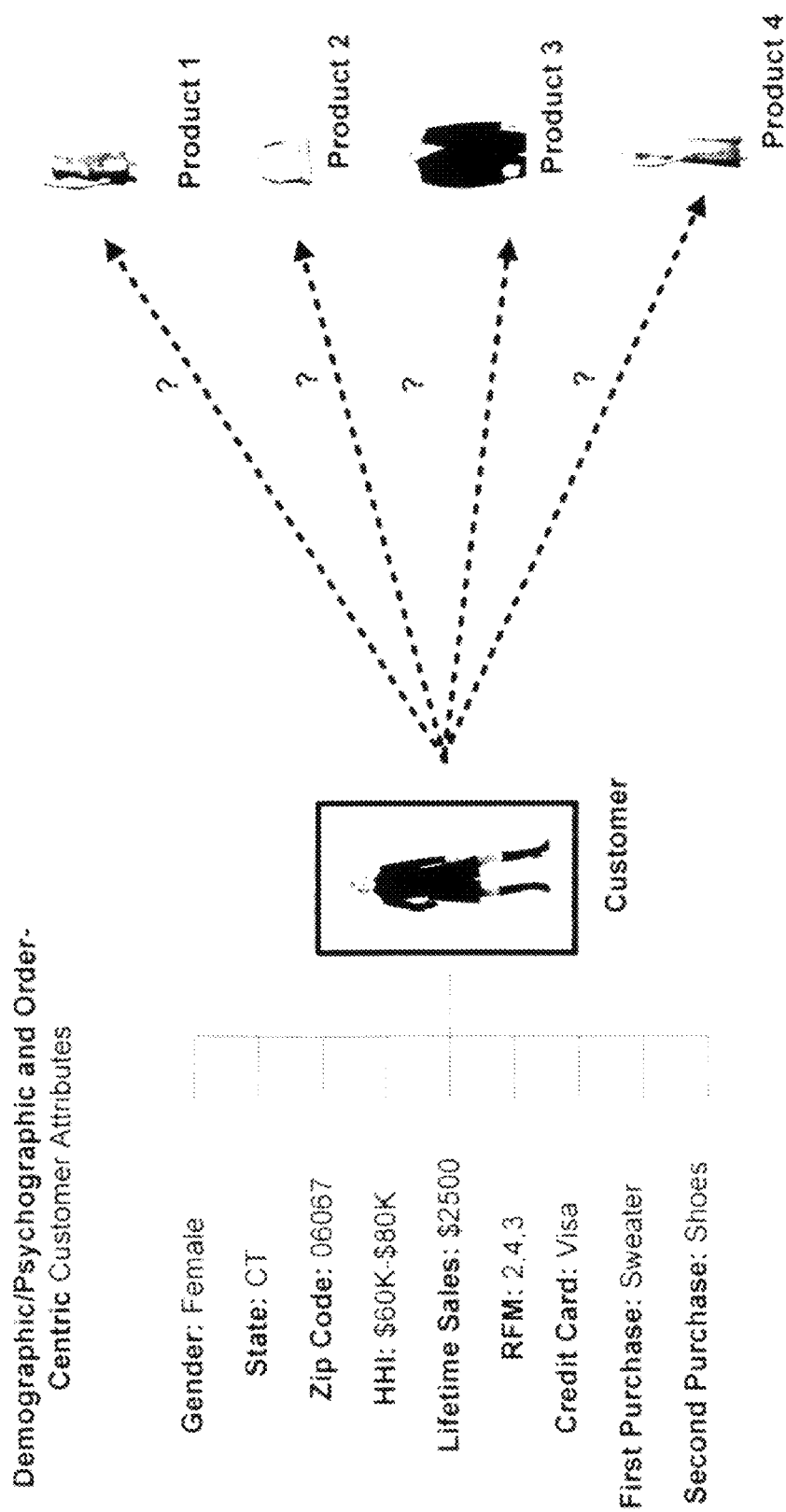
FIG. 9 is an illustration of a targeting limitation of demo/psycho and order-based customer attributes system consistent with one embodiment of the present invention.

Secondly, as shown in FIG. 9, for the small population of customers for which such attributes are available, they often prove far too general to provide any truly differentiated product offerings and thus effective means of targeted marketing and merchandising. Further, the multi-resolutional nature of the attributes makes it difficult to normalize into a single table.

Lastly, when using order data to target customers based on the previous purchase of a particular product or sets of products, there are inherent limitations to repeat purchases of these products. While previous purchase of a particular product has often been an effective predictor of secondary purchase activity, depending on the type of product, there are natural limitations on the number of lawn mowers, digital cameras, and brown suede belts a given consumer will purchase in his/her lifetime. As a result, repeat order conversions of products quickly plummet and serve as a very limited source of recurring revenue.

Including more transactional data points can expose new and potentially beneficial models which can be used to drive commerce dynamics and thus profits. This has been particularly true in the case of clickstream data or weblogs which have been used in recent years to provide insight into aggregate in-store traffic activity and shopping patterns for online retailers. One feature of methods provided herein is that they may use of clickstream data for aggregate analysis of overall shopping activity and traffic and browsing patterns. In the methods provided herein, the use of clickstream data for aggregate clickpath, traffic, and browsing analysis, is largely an analytical and overcomes some of the inherent challenges of incorporating clickstream data into standard database models.

Some of the challenges in working with clickstream data are based on extensive experience in developing advanced enterprise-wide data warehouse systems for leading e-commerce clients. The complexity of the systems which were designed in which clickstream data was the central focus, offered particular insight into the caveats and power of its use that is otherwise unknown in other models where such voluminous data is largely ancillary and thus minimally incorporated.

One primary challenge in incorporating clickstream data lies in the fundamental way in which transactional data is commonly assembled and modeled in databases. As discussed previously, since all actions or events are represented as the central fact tables in the canonical star-schema model, the numerous transactional events that are captured by clickstream data add a considerable amount of complexity to the standard model. Taken individually, each of these events (i.e., Category Browse, Search, Zoom, Register, Add to Cart, Order, Remove from Cart, etc.) are typically represented as separate fact tables to allow multidimensional analysis and modeling. Given the value of providing richer and more expansive insight into specific transactional activity beyond than the oft focused Order event, it has been a prudent strategy to incorporate such high resolution transactional activity across a myriad of dimensions in efforts to gain better insight.

Figure 11:
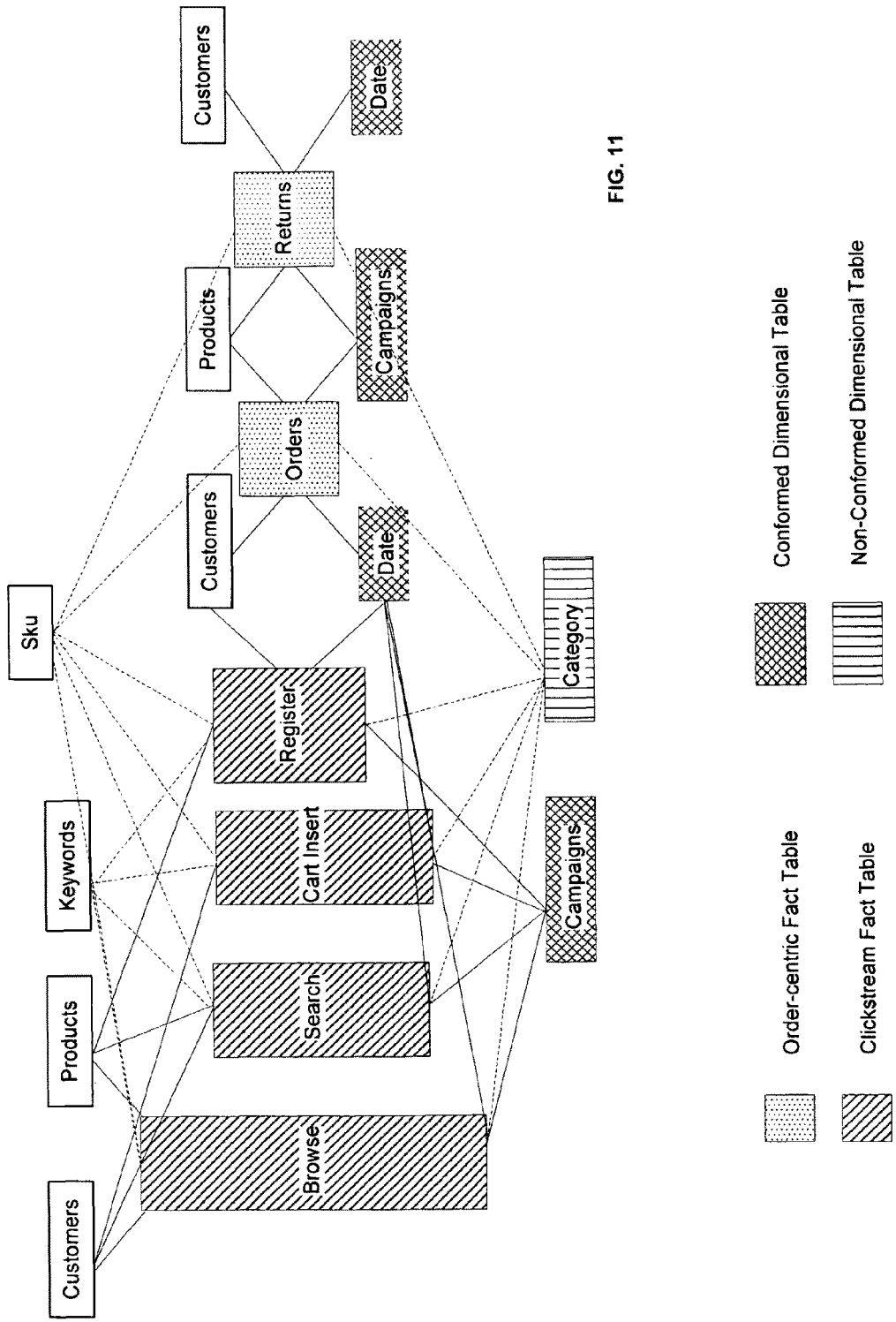
FIG. 11 is an illustration of a multi-event clickstream commerce data model consistent with one embodiment of the present invention.

While the incorporation of clickstream data in a normalized manner as segregated events represented as fact tables is an extension of the star-schema data model 80, as illustrated in FIG. 11, there are significant limitations that become evident when performing critical run-time analysis that render the incorporation of such data minimally useful, often void, and costly.

FIG. 11 illustrates the incorporation of clickstream data into the standard star-schema data model 80. It is logically feasible and often seamless but its functionality presumes an inherently myopic view of the data. In essence, facts are traditionally considered individually for multidimensional modeling. This is due in large part to the typical existence of only one transactional event of record, the order fact table. When the standard model is further normalized to include other traditional events and fact tables such as Shipments or Returns, they can be easily related and analyzed in unison since they are ostensibly events all related to an Order being made. As a result, all three fact tables can share the same resolution or granularity (often the Order Line grain) and thus further enabling the sharing of the same conformed dimensions, primarily Customer, Stock Keeping Unit (Sku)/Product, and Date.

To overcome the inherent limitations of purchase history as criteria for targeting customers, e-commerce companies have tried numerous strategies. These are typically directed at improving their understanding about the varying interests of their individual customers in efforts to appeal to their tastes in a more dynamic fashion. The standard approaches all involve collection of explicit data, usually during the account registration process, from customers about their individual interests, preferences, and tastes. In addition to the determination of customer interests based on the profile information that they provide during account registration and management, the provision of customer ratings, feedback, and survey data, often used by Choice-Modeling techniques and Collaborative Filtering, can be used to determine the interests of individual customers as well as infer the interest of a larger population.

If developed correctly, the schema, can include numerous fact tables can be combined in creative and powerful ways to generate important new metrics during run-time, or even more effectively as an attribute of the customer. In the case of the standard order-centric model for example, net profitability can be calculated for individual customers in addition to gross sales by joining across the Order, Shipment, and Return fact tables with standard formulations involving revenue, shipment, and cost of return figures which can be found separately within respective fact tables.

The use of multiple events is a powerful logical extension of the canonical star-schema which is often overlooked. Given the seemingly limitless amount of multidimensional analysis that can be performed around a singular fact, multi-event fact table analysis, while immensely powerful, is often never considered or immensely underutilized because significant increases in the costs of storage and processing time. While the cost of storage has become less expensive over time, processing time remains a considerable limitation when performing multi-event modeling due to the significant increases in relational complexity involving fully conformed dimensions with granularly consistent high volume fact tables larger which often undergo expensive full or partial scans and joins.

Some of the difficulties encountered include difficulties in Join operations across facts due to lack of conformed dimensions and different granularities. Additionally, customer dimension may become unconformed because massive explosion of anonymous visitors generating clicks that can no longer be associated with customer dimension.

Even if the volume of the data were more manageable there is still another important limitation in performing analysis of clickstream data which involves the lack of conformity of the relational dimensions. By including new and unconventional new events, there is the increased likelihood that many of them will not share the same dimensions and granularity because they are entirely distinct and non-related actions. In such cases, many of these events, represented as fact tables, have their own distinct dimensions, such as the search event, which has its own dimension for attributes of the searching activity such as keywords used. One feature of the present invention is that it may employ a singular fact table where user preferences may be normalized to a particular resolution or granularity.

The use of individualized dimensions is useful for multi-dimensional analysis of a singular event. When performing analysis across multiple fact tables, the issue of dimensional non-conformity becomes a significant analytical limitation. For instance, in the case of a category browsing event, its representative fact table can not be related to a Sku or Product dimension as with other traditional fact table events such as Orders because the user is not interacting with Skus during this activity. They are instead interacting with products at a higher taxonomy, in particular, categories of products and, as a result, have a logical relationship with a Category dimension. Furthermore, the Category Browsing fact table would be modeled at a Category-level product granularity where as others events such as Basket Insert or Order would be modeled at the Sku-level product hierarchy. This non-conformity of dimensions may preclude proper and efficient traversing and joining across multiple events and hence fact tables thus creating a barrier to important and otherwise very powerful analytical modeling of e-commerce data. One aspect of methods provided herein is they overcome these inherent limitations of non-conformity.

Additionally, current methods have limited semantical enrichment and entity resolution which warrants equal consideration. Designed originally to capture the file request logs of various servers, clickstream data was system-centric as it provided important information about aggregate file request usage, a proxy for traffic usage, and overall insight for the operation and management of the data processing architecture by enterprise-wide systems. As a result, there has been little to no visibility into differentiated shopping activities by actual customers in the relation to the universe of available content or merchandise. This is due in part to page id requests and IP addresses were the only parameters captured. The use of IP addresses introduced further levels of customer abstraction as many were proxy IP addresses assigned by commercial ISPs.

In recent years however, clickstream data has been augmented to include unique identifiers to key entities such as customers, products, content, campaigns, affiliates, visits, orders, etc. to improve downstream semantical resolution to respective attributes found in dimensional tables for important analytical insight. There are, however, important limitations to note in terms of the resolution of customers that can often lead to blindspots in customer analysis. In particular, the cookie id is used often as a proxy for the individual customers and in the case where behaviors and shopping habits of individual customers are being determined based on their clickstream activity, the models that are generated are technically that of an anonymous user or often set of users that are using a computer. Consider further the occasions when customers delete their cookies and hence new IDs get generated and the relational integrity of actual customers is further compromised. Hence, with potential many-to-many relationships between customer ids and cookie ids, the assumption can not always be made that the recorded clickstream activity is actually generated by and thus can be assigned to a specific user.

This limitation may be overcome in some instances where the user decides to log in, manage their account, or make a purchase, customer resolution can be assured as their clickstream activity can be directly associated with their customer ID which is implicitly provided in addition to their cookie ID.

All these factors have resulted in the common non-use, underutilization, and misuse of clickstream data in e-commerce analysis and have thus contributed to the meager performances of current personalization technologies given the inherent reliance on richer data about customer habits and activities. As a result, clickstream data is typically no longer collected internally by most e-commerce companies and, if so, is archived or purged despite the recognition of its potential hidden value because it is considered far too costly, complex, and unwieldy to provide any significant and consistent economic benefit.

Nonetheless, there is considerable development in new technologies to effectively mine and capitalize upon the vast torrents of clickstream data that continues to be collected for ever increasing numbers of online companies and their customers. While there has been some economic success in certain applications of clickstream analytics, many of these technologies fail to unlock the fuller potential of this inordinate amount of online transactional data because they have not transcended the traditional singular-event focused data model. Even though popular web analytic service providers have managed to successfully enrich clickstream data to provide powerful reporting intelligence on aggregate browsing behavior and shopping patterns, they have constrained their analysis to the most important online actions, either in unison or independently, without critical dimensional perspective. There is often no richer contextual understanding, often represented as a model, of whether actions exhibited by such customers necessarily lead to more/less purchases because that would require, as previously discussed, introducing the immense complexities of traversing multiple clickstream fact tables. It is therefore an object of the methods provided herein to enable more efficient utilization of clickstream data.

As a result, the spectrum of online actions generated by end-users during visits are often considered independently from each other giving only an aggregate non-contextualized view of what is occurring online and with limited insight into why it is occurring and by whom. Even in rare cases where individual events such as Product Views, Searches, and Orders can be tied back to individual users, this does not ensure the critical capacity to actually target such individuals because their user ids generated by the analytic service provider are usually different from the internal keys generated by the client companies thus precluding any data resolution of customers. As such, there remains a major void in current web analytic providers to effectively provide the capability for client companies to target their customers with particular merchandise based on their browsing behavior because the information provided about important online transactional events are agnostic to individual customers and products.

Given this considerable targeting limitation prevalent in current web analytic providers, in more advanced clickstream-based personalization services are providing real-time in-session marketing and merchandising offers. Consistent with various embodiments of the present invention a system and methods for advanced electronic commerce has been developed which enables users to increase order conversion and profits. The methods provided herein are a paradigm shift from the traditional commerce data model because they reflect a fundamental departure from the conceptualization of the traditional business models. Online shopping, like real world offline shopping, entails a wide myriad of transactions and events not solely limited to Order transactions. The order transaction, as mentioned previously, has been the transactional event of focus and data modeling because it is the only action that has been traditionally recorded because of inherent technical limitations of commerce systems.

Figure 12:
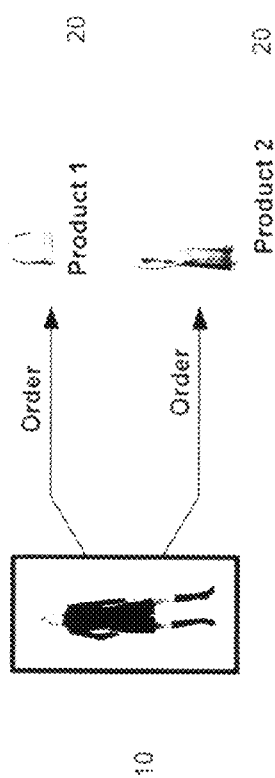
FIG. 12 is an illustration of an order-centric commerce model consistent with one embodiment of the present invention.

The system and methods provided herein may take advantage of order-centric commerce models, as illustrated in FIG. 12, in addition with other clickstream parameters and e-commerce transactional models to create more useful analytic systems and methods for e-commerce.

The Internet has revolutionized the commerce landscape and standard business model by not only enabling a more open channel for continuous and highly scalable transactions, it has also provided a new realm of transactional data of immense dimensional richness and activity resolution to provide unparalleled insight to optimize sales. When analyzed in aggregate, clickstream data can provide some important insight into higher-order traffic and shopping patterns but when modeled at the level of individual users and skus its analytical and hence economic value can be staggering.

One feature of the methods described herein is the use of clickstream data as a window into the shopping psychology, intentions, and interests of individual or segments of customers based on their interaction with products and content or groups of such offerings online. The methods described herein overcome many of the limitations of the current commerce model illustrated in FIG. 12.

In creation of an e-commerce transactional model, other events, which may be derived events or may be events present in clickstream data can be considered as indicators of taste and preferences, then inclusion of several other events, provides manifold enrichment to a customer's profile of interest with a wider range of products and classes of merchandise.

The transactional expansion provides significant and immediate economic lift by greatly increasing the number of relevant products to present to an individual customer. In context of various embodiments, these products may be recommended by a model that considers parameters beyond the singular event of what they have already purchased and may include what they have demonstrated interest in buying based on what they have viewed, browsed, inserted into their cart, searched for, etc. Such individualized targeting based on a broad and cumulative range of interests and thus product offerings serves to dramatically increase a customer's buying likelihood. Moreover, in addition to influencing the buying activity of an individual customer that may have been a previous purchaser, use of this implicit approach to determining interests has even far greater economic impact as it provides a highly effective means of targeting the disproportionately larger population of visitors that have interacted with products in meaningful ways despite having never made a purchase. Hence, in the transactional expansion which involves the inclusion of clickstream data in modeling individual shopping activity can have a compelling economic impact by significantly increasing the target population of prospective buyers based on their individual interests and behavior with specific products.

Recognizing the intensive data processing limitations due to the ever increasing relational complexity of more dynamic and voluminous data, the methods described herein, a fundamental reconfiguration of clickstream data is modeled in the database. Thus, instead of normalizing the data into separate commerce events and hence separate fact tables, in one embodiment various events may combined into one central fact table that become the analytical representation of an overall behavior. Clickstream data is rich in the types of events that may be present, or derived. In one embodiment, a central fact table may comprise a plurality of event types. Many of these events may be present in the clickstream. In some embodiments, central fact table events may be derived event types wherein the data present in the clickstream may be combined with other factors. In its fundamental form, a behavior can be considered a series of linked events and in the context of shopping, there are a universal set of distinct events that be combined to represent various shopping behaviors.

Some of the more universal type of events exhibited by the shopper in relation to a product are captured in clickstream data and can typically be represented as individual fact tables in the analytic data model. But, as has been discussed previously, it is the consideration of these customer actions as separate events and thus separate fact tables that has been the central limiting factor in high-throughput modeling of clickstream data as an effective source of personalization and target marketing and merchandising.

It is one thing to know what the most popular search terms are and whether they reflect actual products that are being carried or available in inventory. It is another thing to know what types of customers are performing these high frequency searches and whether or not they lead to evaluation of products and eventual purchase of hopefully high margin products. The latter form of analysis, as evident, requires the joint modeling of several events, in particular, the Search, Product View, and Order events. Any such attempt to model across multiple events spaces (fact tables), particularly clickstream data, becomes immensely processing intensive during runtime and often impossible due to increased normalization, data volume, and dimensional non-conformity.

Figure 13:
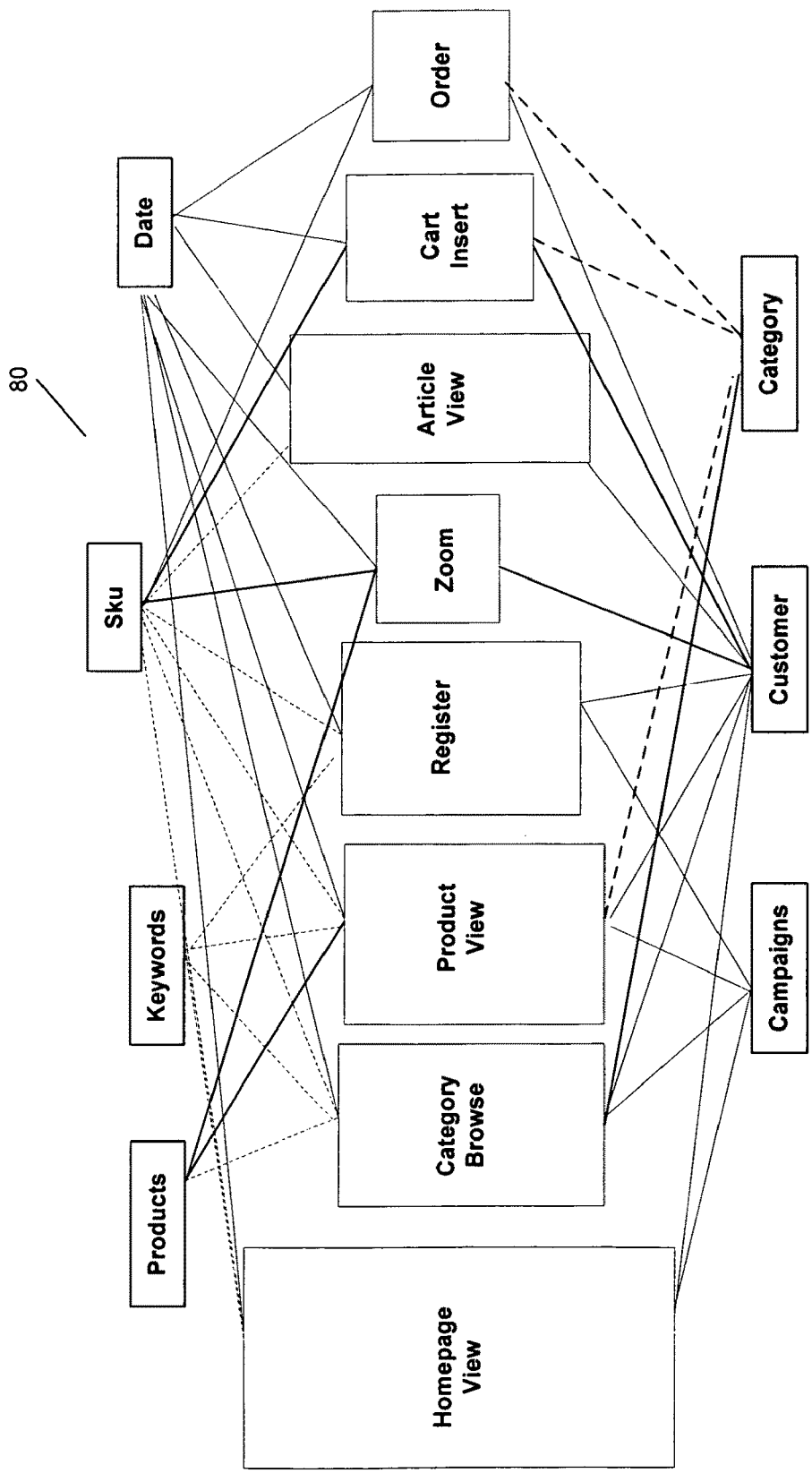
FIG. 13 is an illustration of a multi-event clickstream commerce data model consistent with one embodiment of the present invention.

As illustrated in FIG. 13, and discussed above, the typical integration of clickstream activity is in discrete events incorporated into the standard star-schema data model 80. The sheer size of the these data sets make its utility limited and its run time-processing extremely time-intensive, if not logically impossible.

In various provided embodiments, creating a singular commerce event that can overcome these technical limitations and thereby provide a truly powerful means of personalization. Significant performance increases are realized. In most contexts, the actions exhibited by users are not entirely random, as they are often oriented to a particular goal. This is no different in the case of shopping and in this particular case, doing so in the grocery store where the goal of the visitor is to purchase a product. While the prevailing action of focus is that of the purchase, there are a universal series of events, in sequential logic, that eventually lead to the purchase.

Figure 14:
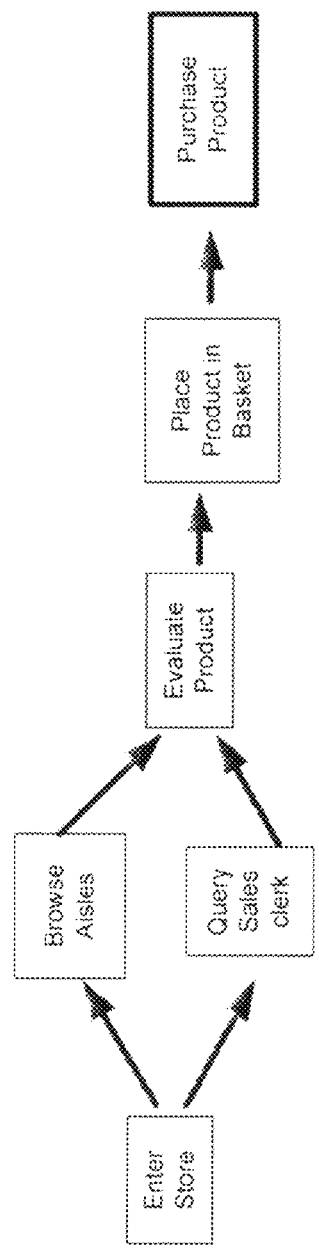
FIG. 14 is an illustration of an implicit shopping process consistent with one embodiment of the present invention.

As illustrated in FIG. 14, the set of actions exhibited by the shopper can be largely classified into a standard set of actions occurring in a linear process that often begins with entering the store, trying to locate a particular product or sets of products either through passive browsing or active searching often with the aid of a sales clerk, eventually finding and evaluating the product, considering it for purchase by placing it into a grocery cart, and eventually making a purchase. Consideration of this entire shopping process is important and can be applied to every customer for every sku with which they are interacting as they consider it for purchase.

Figure 15:
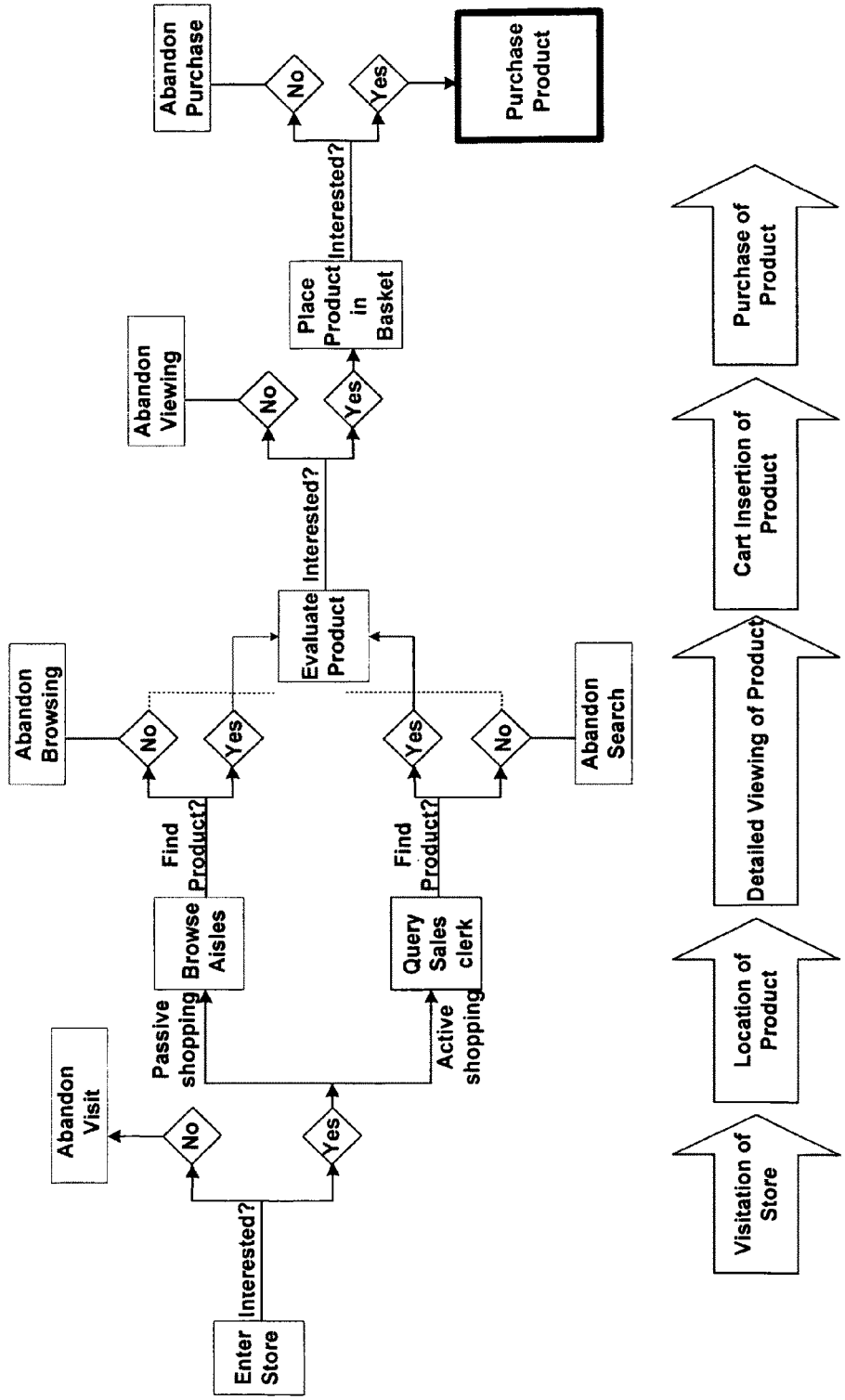
FIG. 15 shows a shopping model illustrating conditional shopping logic consistent with one embodiment of the present invention.

When examined further, as illustrated in FIG. 15, a more informative decision-based shopping process emerges where each event becomes conditionally dependent on other events given whether or not the goals of the shopper are being met along the way. In particular, the types of events exhibited and their frequency can provide valuable insight into the shopping psychology or the individual. For example, while an individual may vacillate between both modalities, demonstration of browsing activity can indicate a more passive and undirected consideration of products whereas requesting the aid of a sales clerk, especially early on during the visit, suggests a more active and surgical shopping mind frame.

Figure 16:
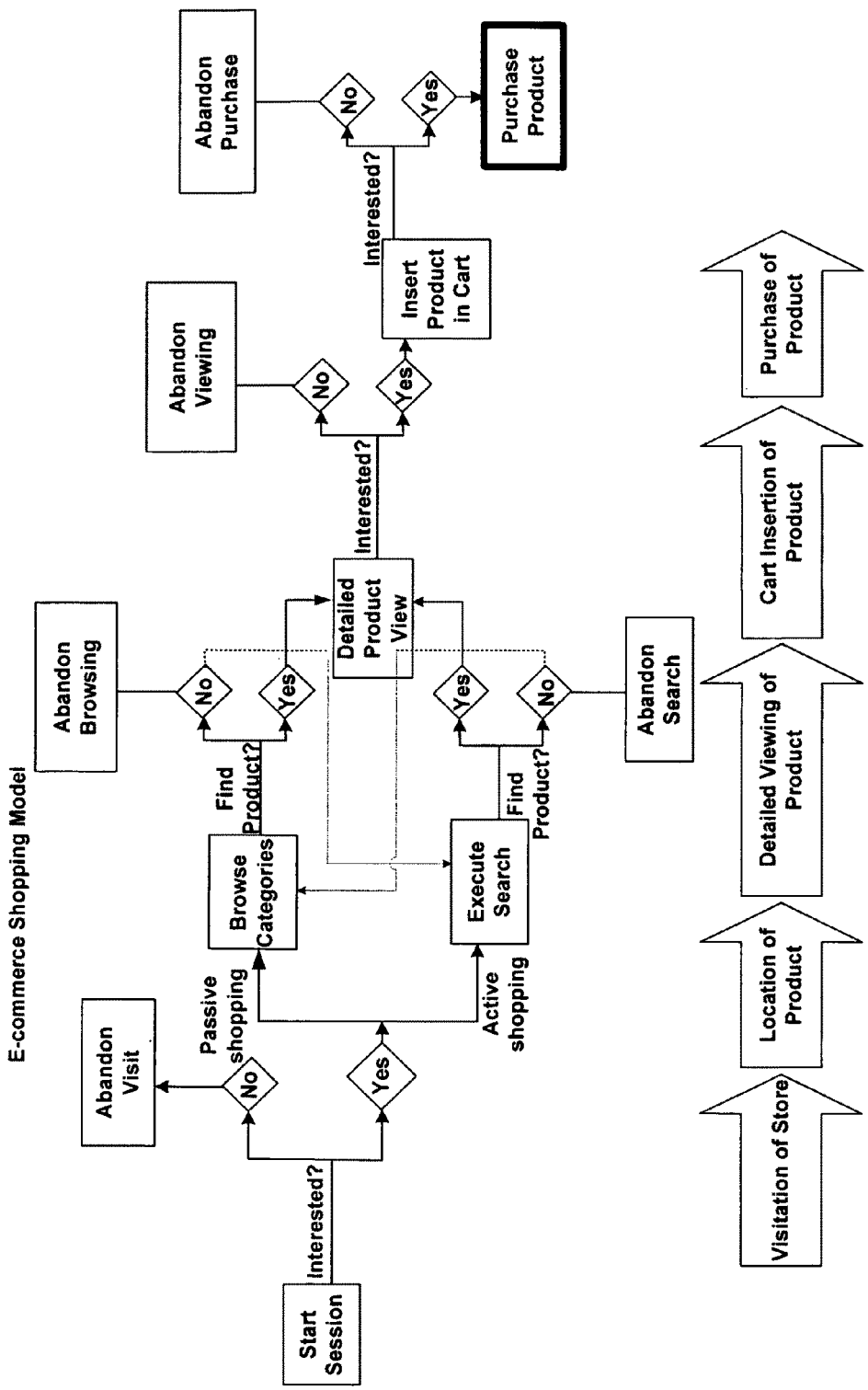
FIG. 16 is an illustration of an E-commerce shopping model consistent with one embodiment of the present invention.

As illustrated in FIG. 16, the same conditional shopping paradigm can be applied to e-commerce with the added and distinctive advantage that nearly all events exhibited by the user, can now be recorded in the form of clickstream data and mined for the development of powerful new constructs provided by various embodiments of methods provided herein.

Whether explicitly recorded as individual events or selectively parsed and partitioned by initial processes of the methods, the file/page request logs of clickstream data can be classified into higher-order universal commerce events. These events can provide insight into distinctive combinatorial shopping behaviors on the part of individual customers. To achieve these individualized shopping behaviors and thus interests, a number of exhibited actions by the online consumer are considered in the methods provided. These actions are considered as significant events that may be indicative of a shopper's interest and intent in making a purchase. However, there are several limitations that arise as a result of this new approach the most pronounced being the associated technical costs of additional storage and processing time to manage and model exponentially more data points from the inclusion of these additional clickstream events.

Figure 17:
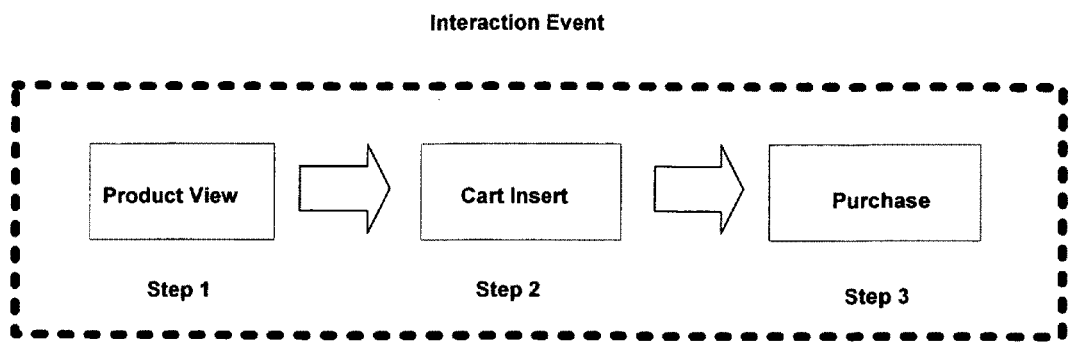
FIG. 17 is an illustration of a interaction event consistent with one embodiment of the present invention.

As illustrated in FIG. 17, to avert the technical complexities of modeling these multiple events as distinct fact tables, they may be combined into a singular fact table to represent an emergent behavioral ontology of interest and interaction of customers with an entire range of products. Exemplary events illustrated in FIG. 17 are product view, cart insert, and purchase.

When considered in unison, these various events ostensibly represent a more expansive and enriched singular event space to signify a customer's varying levels of interaction and thus interest serving as the basis of a shopping interaction score for every consumer. Although the customer may have only purchased one product, a dress, she has nonetheless interacted with a number of other products with various degrees of interest and commitment based on the depth of her shopping conversion with respect to each of them individually.

One feature of the system provided is that based on the level of enriched transactional intelligence, a Shopping Interaction Score can provide powerful insight into the preferential interest or affinity of individual customers to individual products based on implicit calculations of their dynamic clickstream data. In one embodiment, a shopping interaction score may be derived from different types of events. Other personalization solutions often require that customers explicitly indicate their preferences and interests or actively rate products or answer survey questions in order to improve the accuracy and overall performance of their analytics. Here, the described model requires no such input from customers. Instead, the interests and preferences of customers are passively derived based on their implicit and unbiased activity online as they interact with products.

From a targeting and personalization standpoint, customers can now be selectively targeted with a larger and more pertinent choice set of products based on their differential shopping behavior. Furthermore, products can be ranked to enable preferential offering based on the customer's Shopping Interaction Score. As such, while the customer may have already bought a handbag twice and a dress, we may chose to offer her, based on her interaction and inferred interest profile, the pair of shoes and, at some later date, the green blouse and lastly the red one.

If we were to consider two customers that purchase the same product, the handbag, ordinarily, based on standard order-centric analytic approaches, there would be no way of differentiating the interests of these two customers to the product. Perhaps if multiple orders had been made, for instance Customer A having purchased 3 bags versus customer B that only bought one, assumptions could be made that Customer A has a greater "interest" or "affinity" to PRADA handbags than Customer B. However, sole reliance on multiple purchasing activity precludes further insight into compelling differences in their buying behavior.

Based on the construction of a Shopping Interaction Model, various embodiments include the previous events exhibited prior to the purchase of the product, and exploit the significant differences in the shopping behavior between the two customers. Based on the relative frequency of events exhibited across a frequency of visits (sessions), new shopping behavioral patterns emerge. Further, Customer A is far more stringent and exhaustive in evaluating the handbag prior to purchasing it, having exhibited a specific set of behaviors over a greater number of visits, and thus far less of an efficient shopper than Customer B. Based on aggregated frequency distributions of these shopping interaction events, new insight can be provided into various shopping behavioral ontologies exhibited by individual customers or segments of customers in relation to specific products or sets of products at taxonomical levels.

Figure 18:
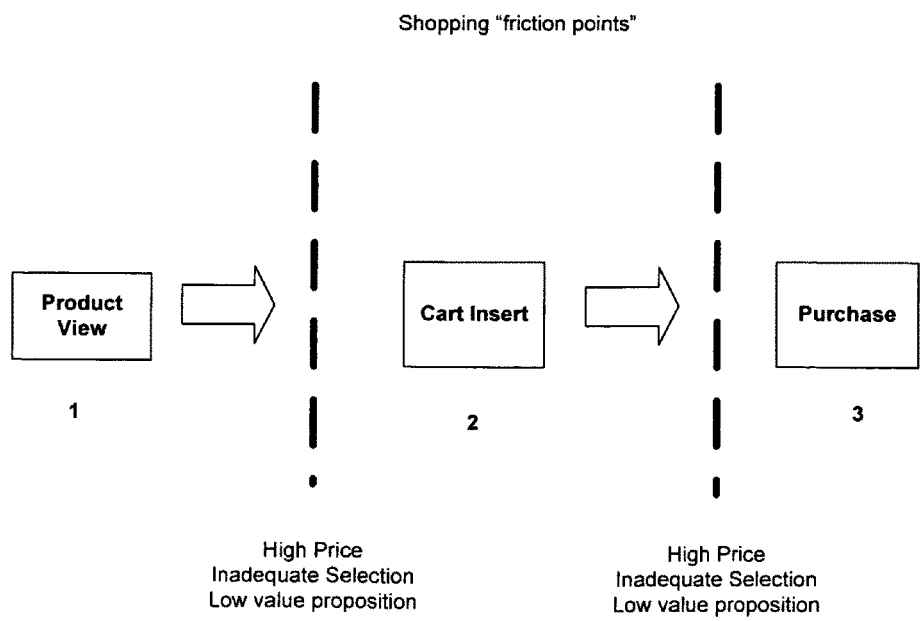
FIG. 18 is an illustration of shopping "friction points" consistent with one embodiment of the present invention.

One benefit of this ontological model is that it enables powerful behavioral micro-segmentation and targeting of customers in order to more effectively influence their purchasing activity. When considering the overall shopping process, there are natural friction-points, illustrated in FIG. 18, such as price, breadth of selection, communicated value, and visibility of product, which preclude complete and efficient purchase activity. This may be particularly true when considering the impeding factors that may cause a customer to abandon and completely forgo purchasing a product after viewing it in some detail or even inserting it into their shopping cart. In particular, it is the aggressive price point, inadequate selection, and/or low value proposition of products that all serve, in various degrees, as significant barriers to purchase and they can essentially be inferred and selectively pin-pointed and addressed by these new shopping ontologies that are derived.

Thus, the frequency distribution of these conditional events all involved in the purchase of a product assimilated into a novel attribute that represents a customers level of interaction as well as interest offers unparalleled targeting capabilities. One feature of various embodiments is that not only does the model provide a business user with information of what customers are interested in which products (and vice versa) but also insight into some of the reasons why they have yet to make a purchase despite their interest. Certainly an understanding of these impeding factors may be used to inform the type of marketing and merchandising treatment offered to specific customers such as selective discounts or additional information on products or alerts on when new products or related products have arrived or special sales events or clearances. It is likely that far too many price-insensitive shoppers are arbitrarily offered discounts all of the time on products that they would otherwise pay for at original prices because there remains the overwhelming perception that this may be the best way to minimize inventory risk and ensure a purchase. Moreover, companies often have no way of accurately determining the relative price sensitivity of their customers and thus have no the means of micro-segmenting them based on this dimension.

Figure 19:
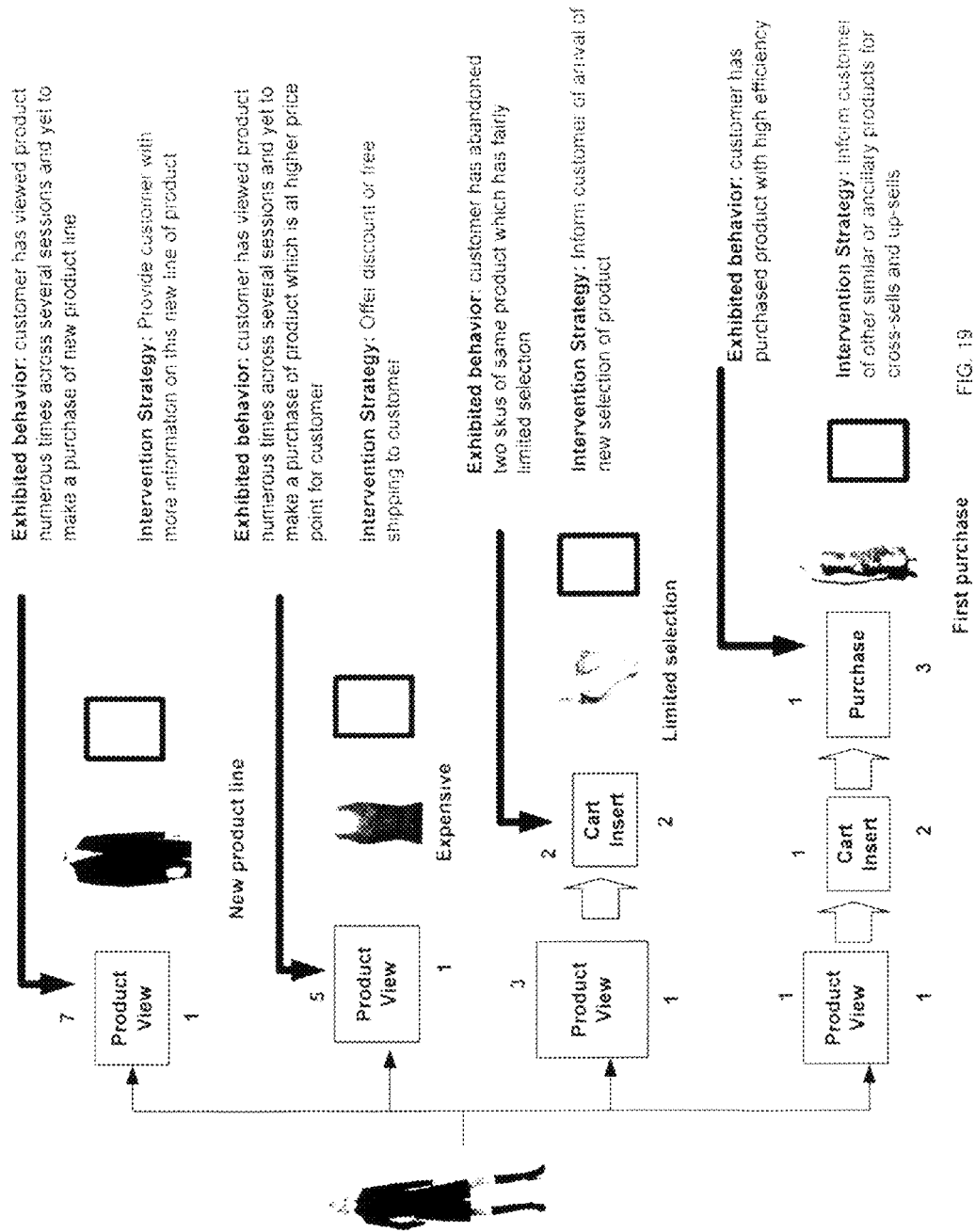
FIG. 19 is an illustration of exhibited behavior and intervention strategy consistent with one embodiment of the present invention.

Thus in the wake of indiscriminate treatments such as generalized price reductions, the system and methods provided herein and illustrated in FIG. 19, allow for an alternate consideration that purchasing activity can be equally influenced, with the selective offering of the right product(s) to the right customer(s) based on the customers' observed interests. As such, a customer may just as likely to buy a sweater from an email alert that they receive about the arrival of such a sweater in their size and their favorite brand than an email about 10%-off on all sweaters. Further, based on the use of the system and methods, purchasing activity could be further influenced by the selective interest-based targeting of customers that may have only browsed lightly or seriously evaluated a product and considered it for purchase only to retract that decision at the last minute of their shopping visit instead of those who may have already purchased it and are thus perhaps less likely to do so again for a third or fourth time.

Figure 20:
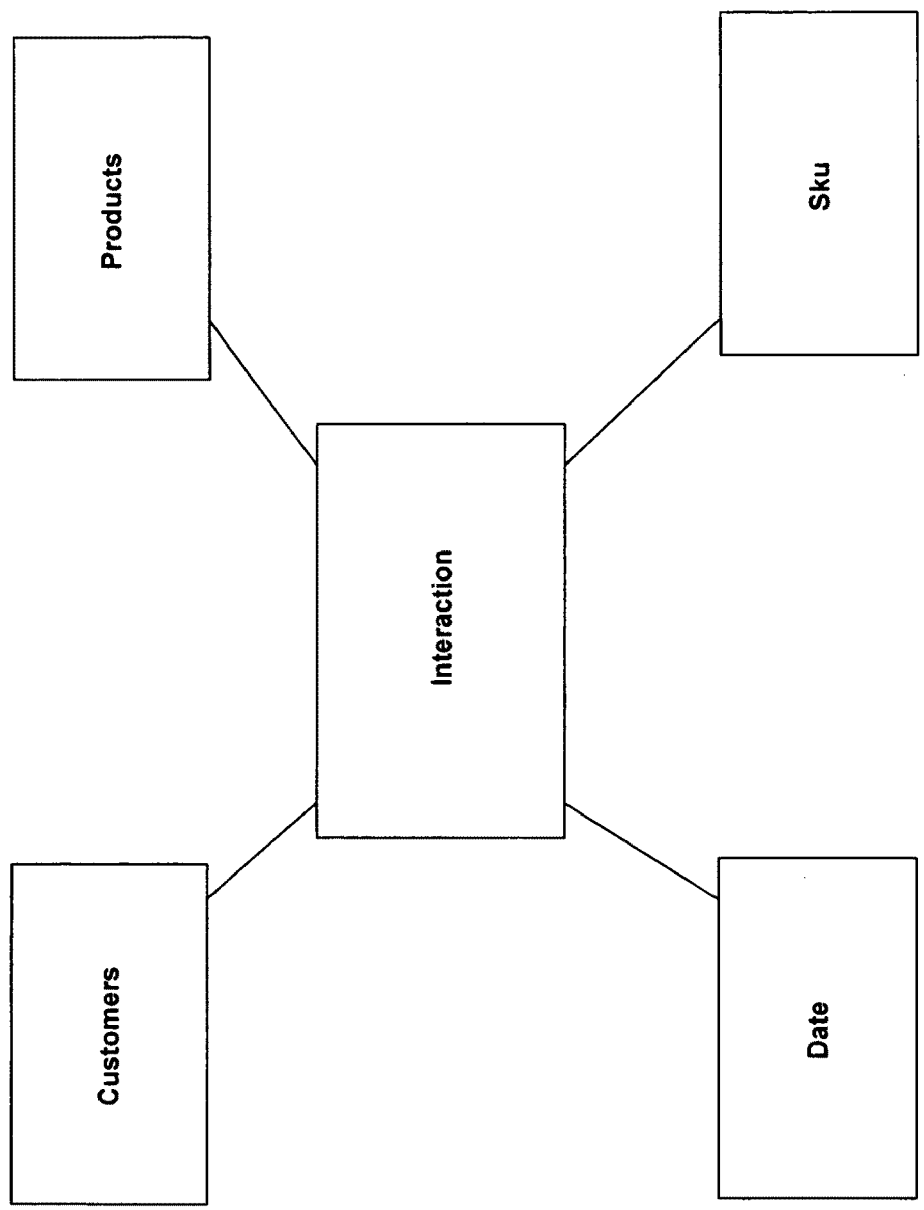
FIG. 20 is an illustration of a behavior model consistent with one embodiment of the present invention.

Thus, whether there may be price-sensitivity or inadequate selection of product based on the various dimensions of the product (i.e., size, color, category, brand, etc.), the system and methods can provide powerful insight into often hidden shopping dynamics to enable high-performance precision marketing and merchandising at any preferred resolution (dimensional aggregation) involving customers and products. A number of events and other parameters may be modeled, as illustrated in FIG. 20.

These are some of the emergent dynamics that serve as the foundation for this high-performance personalization system that can be applied across a wide range of enterprise systems to optimize commerce and drive sales with unparalleled economic lift. One advantage of this advanced system lies with the high-throughput modeling of clickstream data based on a fundamental redesign of the commerce data model to a more denormalized intelligent fact table to reflect a more expansive and thus effective behavioral model.

Systems and methods provided herein provide for a new e-commerce model that allows the modeling of customer behavior to determine interest and forecast purchasing behavior. These systems and methods may utilize implicit behavioral attributes, known as customer-product attributes to provide two major advantages. They allow the online merchant to include products and preferences in customer profiles and they expand the "event space" to include differentiated interests.

Figure 21:
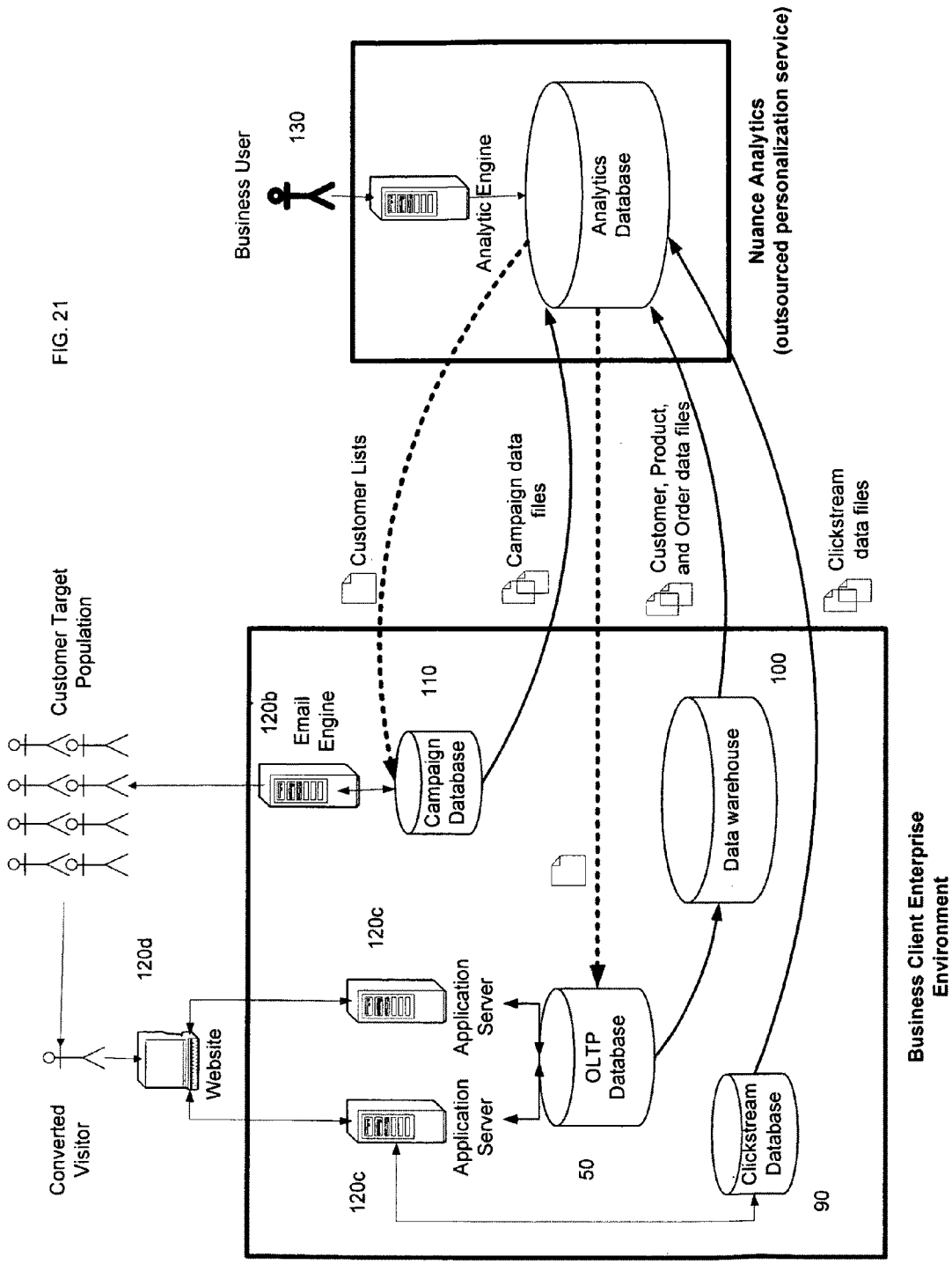
FIG. 21 is an illustration of a nuance analytics data flow system architecture consistent with one embodiment of the present invention.

In one embodiment, illustrated in FIG. 21, a system, is provided to produce high-performance campaign models for companies based on their universe of customers and merchandise. As such, the data about these major entities (Customers 10 and Products 20) as well as the transactional data between them is collected continuously from various data sources. In this embodiment, business user 130 interacts with computing device 120 and configures the analytic engine present on computing device 120a to generate a target marketing campaign through computing device 120b containing an email engine. In this embodiment, analytic data base 140 receives data from campaign database 110, data warehouse 100, and clickstream database 90. As illustrated, some embodiments may include an OLTP database 50 which sends data to data warehouse database 100, and interacts with computing devices 120c, illustrated as application servers. Computing devices 120c interact with customer 10, through computing device 120d displaying an interactive Graphical User Interface (GUI) such as a website.

Through the configuration of computing apparatuses 120a-120c, a targeted email campaign can be generated and sent to a select group of potential customers in a target population.

Three major sources have been identified as common sources of the valuable data of customer's page clicking activity or clickstream data stored in clickstream database 90, on a client's particular site. There are distinct advantages and disadvantages to these various data sources and much of this determination is based on the availability and integrity of the initial set of data points. As the present invention may employ a number of different sources of activity data, the present invention is not limited with respect to data source.

Figure 22:
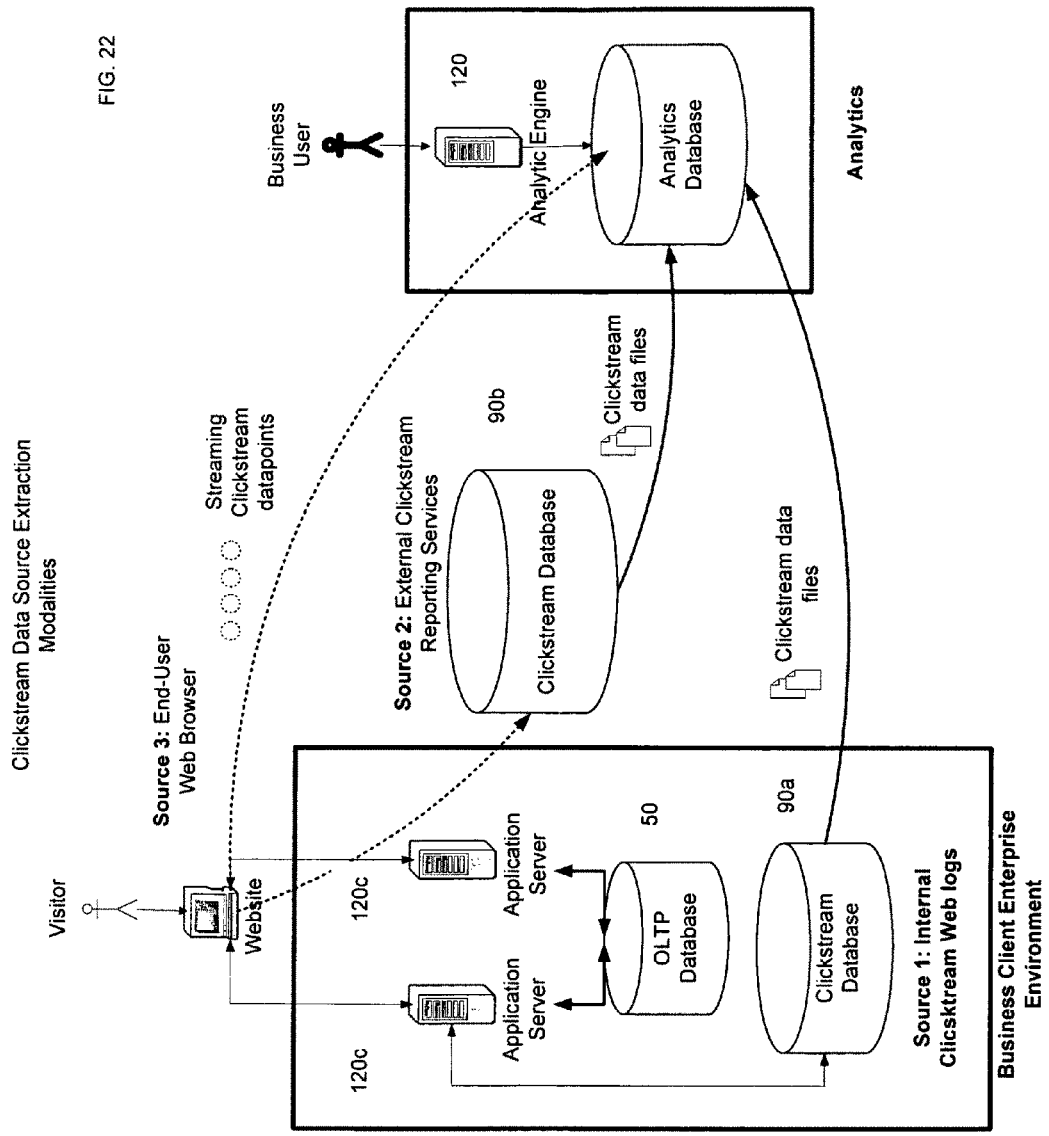
FIG. 22 is an illustration of a clickstream data source extraction modalities consistent with one embodiment of the present invention.

As illustrated in FIG. 22, various formats, most popularly as webserver log files, clickstream data often has a vast set of parameters that can be captured. As further illustrated, clickstream database 90 may comprise a multiplicity of clickstream databases 90 including one present on a business client's system and clickstream databases 90b which are external sources of clickstream data. As illustrated, customer page browsing data can be collected directly from companies whose computing devices 120c (application servers) may be configured to collect web log data. The metadata of these log files have become fairly standardized over the past few years and many commerce application servers (i.e., ATG, Blue Martini, etc.) have more enriched data points. More importantly, the meta data of the clickstream data file are configurable that eventually allow the collection of rich data such as external tracking codes, such as promotional codes, marketing codes, campaign codes, coupon codes, and affiliate codes.

Using clickstream data to derive models in this manner has a number of advantages. First, clickstream data that is collected by a company's internal data systems is relatively easy to semantic enrich. Given that this data will be coming directly from a company's database systems, semantic resolution, or mapping of these transactional files to customer, product, and other dimensional data, is much simpler because of the availability of such dimensional tables within the enterprise. In particular, the system may have access to critical data about customers and products, especially the dynamic properties such as the email opt-in status, inventory position, pricing and assortment position, etc.

A second advantage is the relative ease of gathering the data thus making it a non-intrusive passive form of integration. Often such data is collected in databases that are ancillary to core business systems such a production application databases or data warehouses only to be temporarily stored, very rarely used, and often purged or archived.

As is known in the art, several sources, described as site analytic sources, provide reporting services to online businesses by collecting their own set of clickstream data based on the activities of a company's visitors on their individual websites. In some embodiments direct end user browser feed may be a source of clickstream data. A number of advantages exist in using third-party clickstream data. As stated above, since a number of sources of clickstream data are readily available, and may practice the current invention, the invention is not limited with respect to the data source.

In other embodiments, Order Data may be additionally incorporated. While order, or purchase event, data can usually be collected from clickstream logs, for more stringent auditing resolution of sales metrics (volume, price, promotion codes, shipping costs, campaign codes, coupon codes, etc.) standard order-based transactional data should also be collected to enrich the methods. In particular, these keys may be present to incorporate such back-end order data with the clickstream data: Customer ID; Cookie ID; Order ID; and Session ID. In some embodiments, this type of "back-end" data may be collected from the business client's OLTP database systems or OLAP data warehouse/data mart database systems.

The systems and methods provided, may utilize a set of customer IDs generated and managed by the internal systems of the business client via automated incremental loads. While it is not necessary to have access to the other attributes of customers internally derived by business clients (i.e., contact data, demographic/psychographic data, transactional data, etc.), the ability to incorporate such dimensional data may increase the business user's ability to do more high-performance customer segmentation and targeting. Customer data can be collected from the business client's OLTP database systems or, preferably, OLAP data warehouse/data mart database systems.

The systems and methods described herein may utilize a master set of merchandise-related and/or content-related IDs along with concomitant taxonomies/hierarchies generated and managed by the internal systems of the business client. Access to nearly all attributes/dimensions of merchandise, many of which are dynamic such as price and inventory availability, provides critical data for the multivariate (multi-dimensional) architecture of the methods and its resultant models. This product data can be collected from the business client's OLTP database systems, inventory management systems, or OLAP data warehouse/data mart database systems.

While the importance of marketing and merchandizing stimuli can not be overstated, there are significant limitations in its capture and analysis. Rarely is the rich semantic data (items featured, text used, prices offered, number of target recipients, etc.) about campaigns and promotions that are created by business users captured and maintained in campaign management engines due to the limited metadata framework. This is even more the case in terms of dynamic campaigns that are often used for highly targeted emails.

Often the rich and detailed metadata of these individual in-page treatments that are dynamically presented often based on a personalization rules engine, as in the case of advanced targeted emails, are not captured and thus analyzed.

Additional data sources may include both internal and external systems. Campaign and promotion data can be captured in limited modalities from the business client's have campaign management systems that are often standard packaged modules of various commerce server applications. Additionally, given the more standard use of third-party email delivery service providers, the metadata of campaign designs as well as performance metrics can be collected from their external systems upon request.

The system may be configured to provide high-performance advertising or marketing campaign models for companies based on their universe of customers and merchandise. As such the data about these major entities, Customers and Products, as well as the transactional data are aggregated.

Figure 23A:
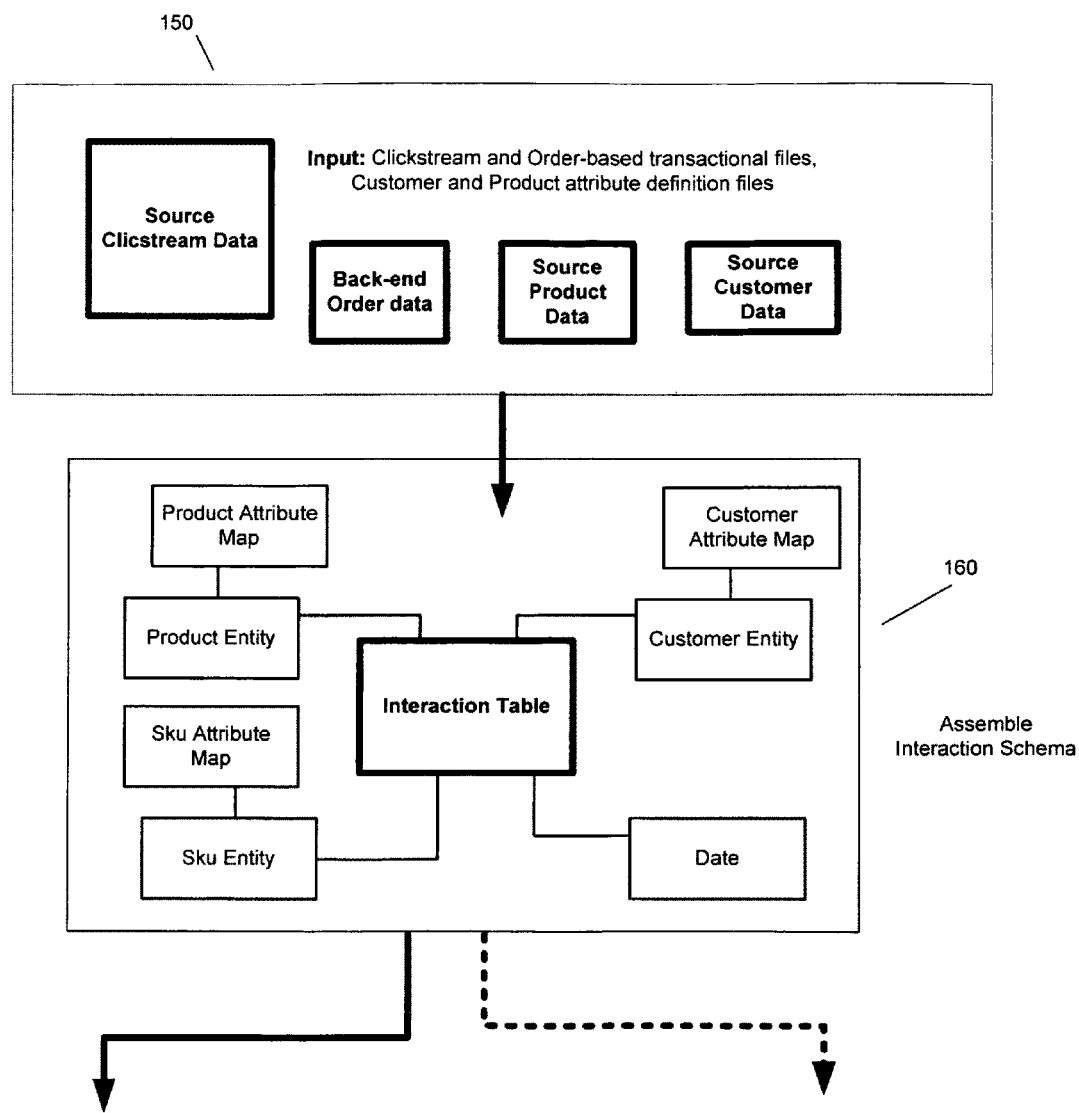
FIG. 23 illustrates a method of generation of customer target lists consistent with various embodiments of the present invention.
Figure 23B:
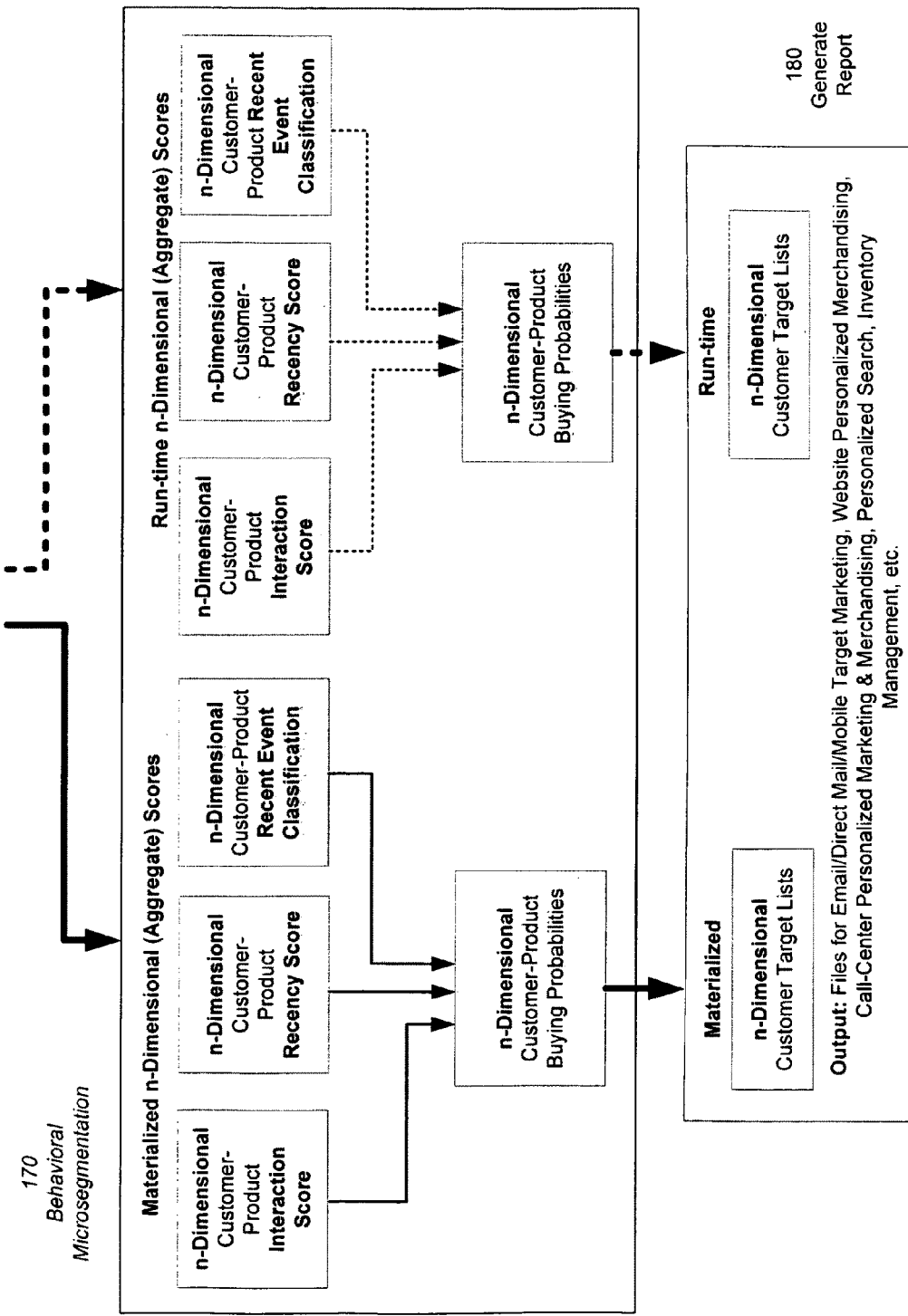

One embodiment of a method is illustrated in FIG. 23. In block 150 source data is collected from a plurality of sources, described above. In block 160 the source data is aggregated into a base affinity schema that calculates the affinities of consumers to various entities (i.e., products, content, service, etc.) across various multidimensional combinations such as implicit taxonomic relations. By way of example and not limitation, the source data may include clickstream data, back-end order data, source product data, and source customer data. As described above, there a number of sources of this type of data available. Additionally, other types of data may be utilized. The Base Affinity Schema may include a Product Attribute Map yielding a product entity; a Sku Attribute map yielding a Sku Entity, a Customer Attribute Map yielding a Customer entity; a data. An Interaction Table may be derived from these and other Entities, as described above. Flow continues to behavioral micro-segmentation block 170, where multivariate customer scores and Materialized n-Dimensional (Aggregate) Scores, and Run time n-Dimensional (Aggregate) Scores are derived. It is important to note that the method illustrated in FIG. 23 combines a pre-processing and run-time blocks. One skilled in the art will realize that these blocks may execute at different times.

As shown, the Materialized n-Dimensional Aggregate Scores may comprise various aspects of customer-product interaction based on various combinations of a breadth of distinct events (actions), the frequency with which such event combinations are exhibited, including temporal factors. Such variables serving as components a shopping interaction score are parameters which may be used to calculate an n-dimensional Customer-Product Buying Probability.

Figure 34:
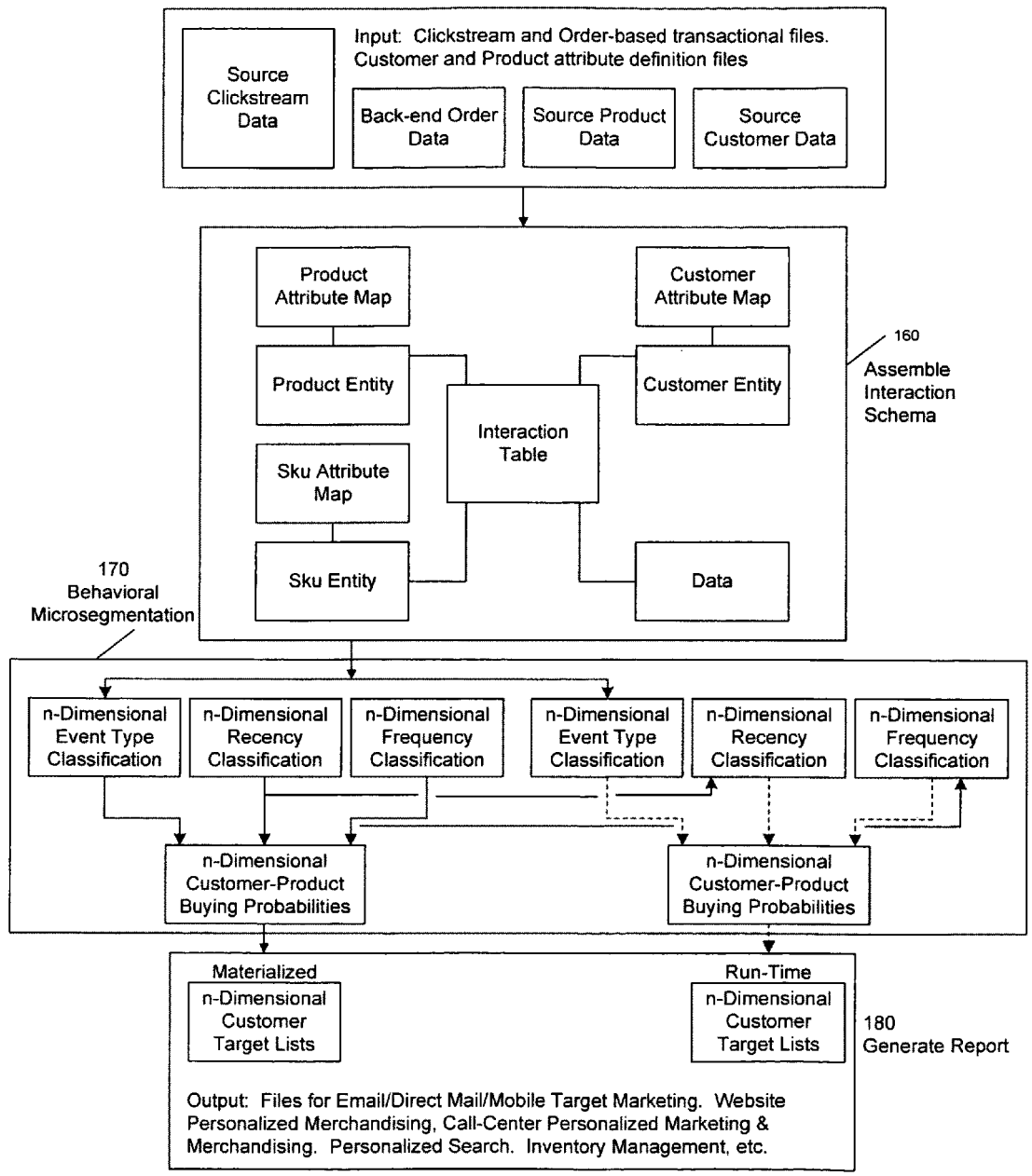
FIG. 34 illustrates another method of generation of customer target lists consistent with various embodiments of the present invention.

An alternate embodiment is illustrated in FIG. 34. This embodiment is similar to the one illustrated in FIG. 23 with a few distinctions. In this embodiment, the aggregate set of affinity scores are included in a n-dimensional an aggregate customer-product interaction event-type classification, a n-dimensional aggregate customer-product interaction recency classification, and a n-dimensional aggregate customer-product interaction frequency classification. Further, in some embodiments, as illustrated, the run-time set of affinity scores include a run-time n-dimensional customer-product interaction recency classification, and a n-dimensional run-time customer-product interaction frequency classification. In some embodiments, the run-time affinity scores are derived, or extrapolated, from the aggregate scores.

A buying probability may be calculated based on any number of known methods including a Hierarchical Bayesian calculation. As is known in the art, Hierarchical Bayesian techniques include analysis and decision making methods which may be based on semi-subjective probabilities (or inferences) coupled with uncertainties (or likelihoods) of event occurrence. Bayesian inference uses a numerical estimate of the degree of belief in a hypothesis before evidence has been observed and calculates a numerical estimate of the degree of belief in the hypothesis after evidence has been observed. Bayesian inference usually relies on degrees of belief, or subjective probabilities, in the induction process and does not necessarily claim to provide an objective method of induction. Nonetheless, some Bayesian statisticians believe probabilities can have an objective value and therefore Bayesian inference can provide an objective method of induction.

A particular customer or segments of customer's probability of purchase for various products is based on the parameters of their derived interaction scores. These probabilities may be updated across a number of discrete time events, to model the interaction and probability for current time which may be used in real-time to target the customer.

Figure 24:
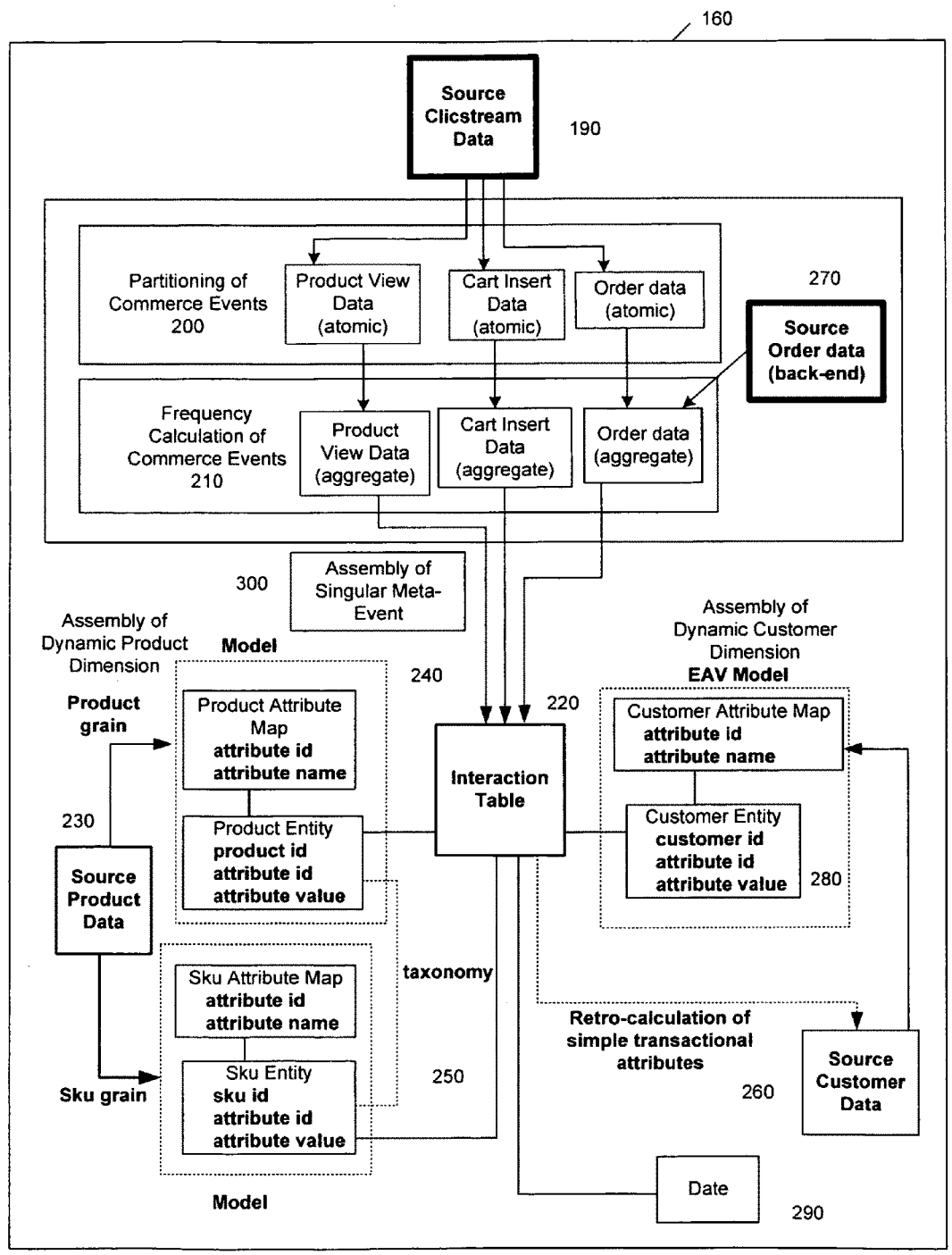
FIG. 24 further illustrates the construction of an exemplary schema.

An exemplary embodiment of the derivation of a multi-resolutional, multi-dimensional, de-normalized interaction table and affinity schema is further illustrated in FIG. 24. In this embodiment, a clickstream data source 190 provides information on a plurality of commerce events. As discussed above, there may be additional data sources employed that are not illustrated here for convenience. Exemplary commerce event information includes, but are not limited to product view data, cart insert data, and order data. As illustrated order data may additionally be received from non-clickstream sources. The commerce events are partitioned in block 200. In this exemplary embodiment, in block 210 a frequency calculation of commerce events is conducted to produce aggregate information. From this aggregate data, a singular meta event is derived in block 300 and stored in the multi-dimensional, multi-resolution, de-normalized interaction table 220.

Additionally, as illustrated, product source data 230 which may comprise a product model 240 and a SKU model 250 at different resolutions. As illustrated the product model includes a product attribute map and a product entity, but some embodiments of the invention are not limited to this exemplary model. In some embodiments the product attribute map comprises an attribute identification, and an attribute name and the product entity comprises a product identification, an attribute identification and an attribute value. In like manner, Sku model 250 is illustrated with a SKU attribute map and a SKU entity, for exemplary purposes. Further inputs to interaction table 220 include source customer data 260 which may comprise source model 280 exemplified to include a customer attribute map and a customer entity. In some embodiments, the customer attribute map comprises an attribute identification and a attribute name, and the customer entity comprises a customer identification an attribute identification, and an attribute value. Interaction table 220 may further include a date 290

Figure 25:
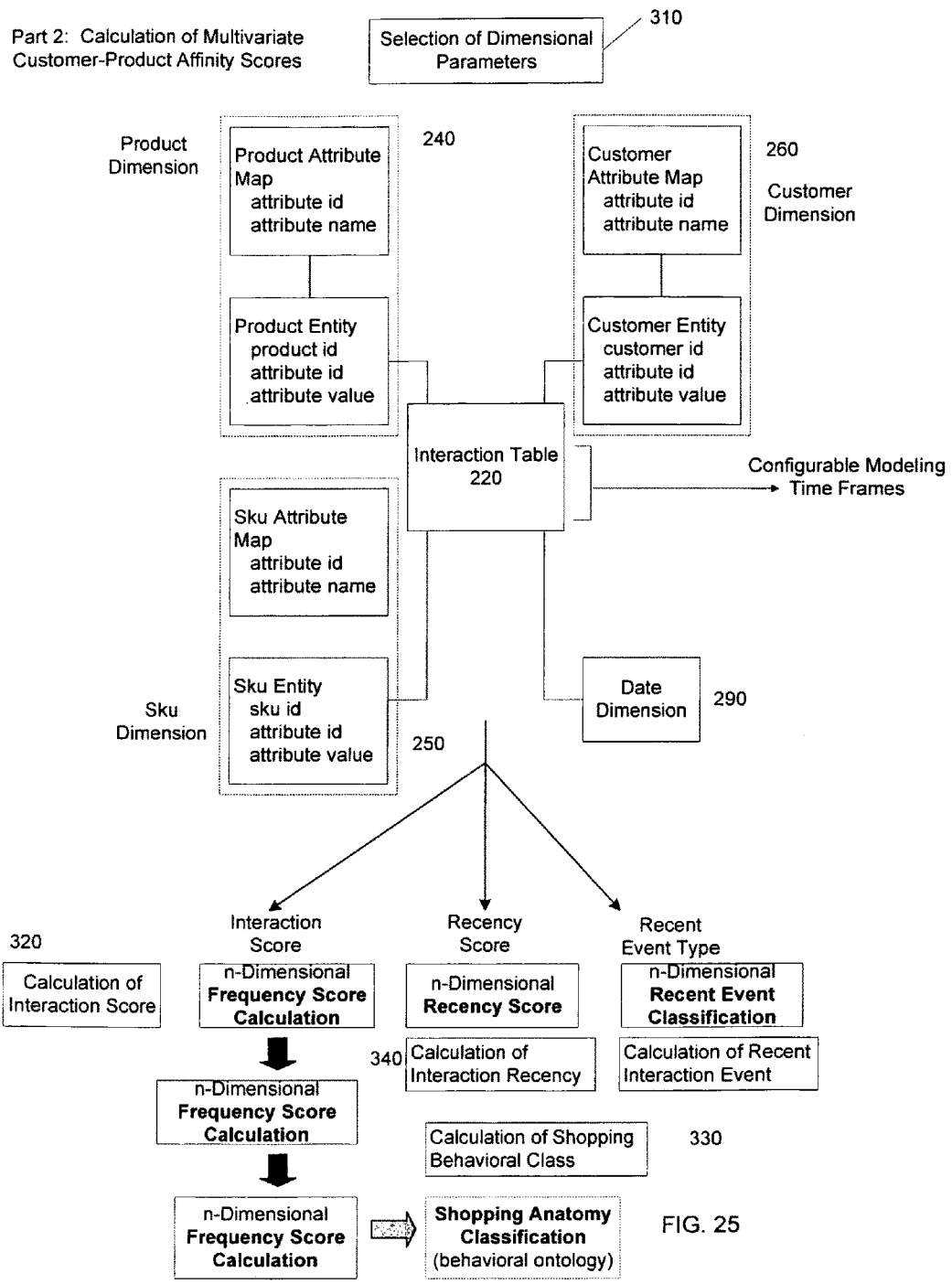
FIG. 25 illustrates an exemplary calculation of affinity scores.

Referring to FIG. 25, which illustrates an exemplary embodiment of the calculation of affinity scores from interaction table 220. As previously discussed interaction table 220 comprises product model 240, SKU model 250, customer model 260, and in some embodiments, date 290. It is important to note these models are multi-dimensional and de-normalized. Further, since the events span multiple time frames and resolutions, interaction table 220 allows configurable modeling time frames. In block 310 a selection of dimensional parameters is performed. In block 320 the calculation of an interaction score is performed. As illustrated, the calculation interaction score calculation, in some embodiments comprises calculating an n-dimensional frequency interaction score, normalization of the n-dimensional frequency score, and the derivation of an n-dimensional interaction score. Which, in block 330 is used to calculate a shopping behavioral class. Returning to interaction table 220, in block 340 an n-dimensional recency score is calculated and in block 350 an n-dimensional recent event classification is calculated.

Figure 26:
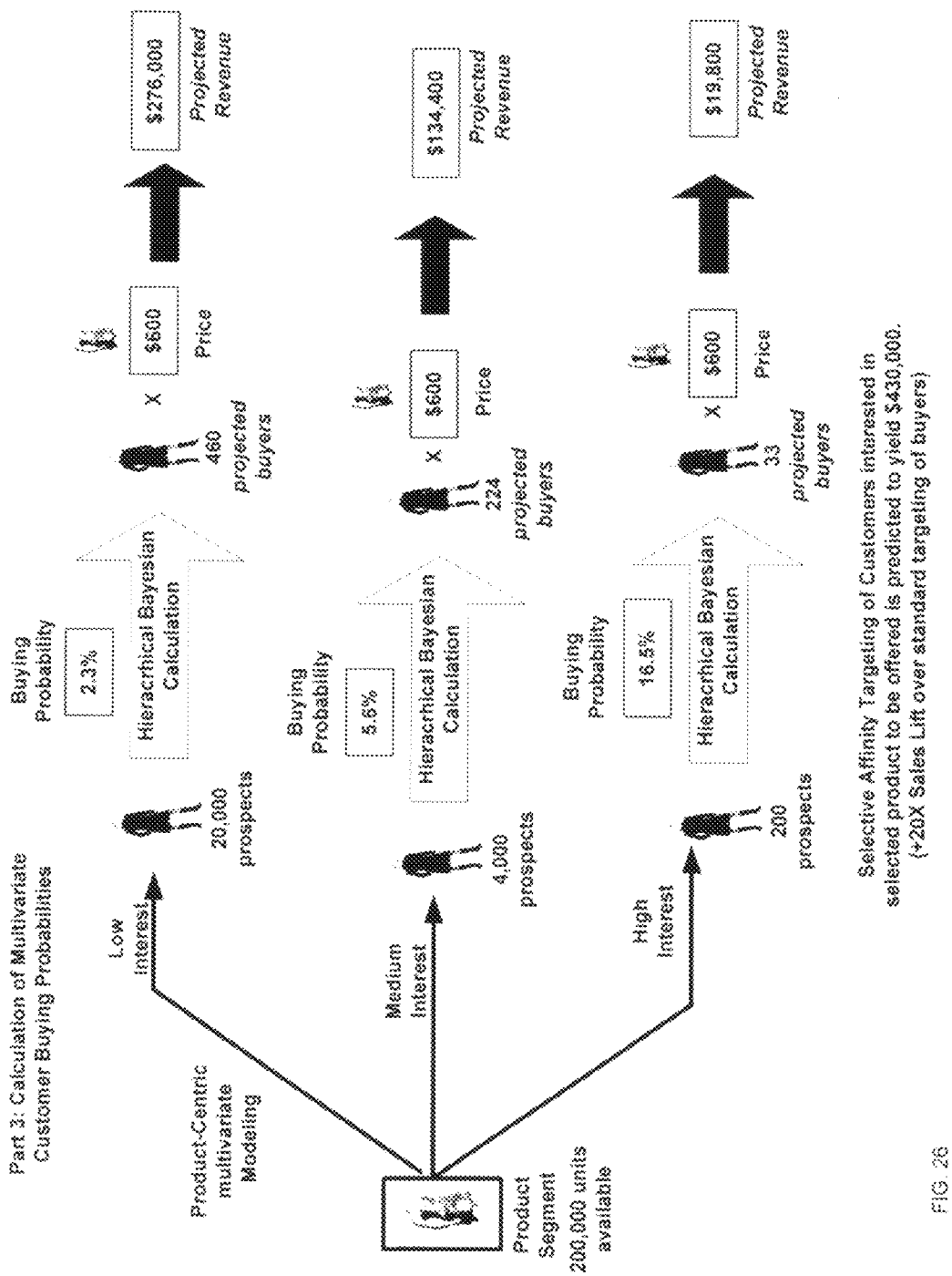
FIG. 26 illustrates product-centric multivariate buying probabilities.
Figure 27:
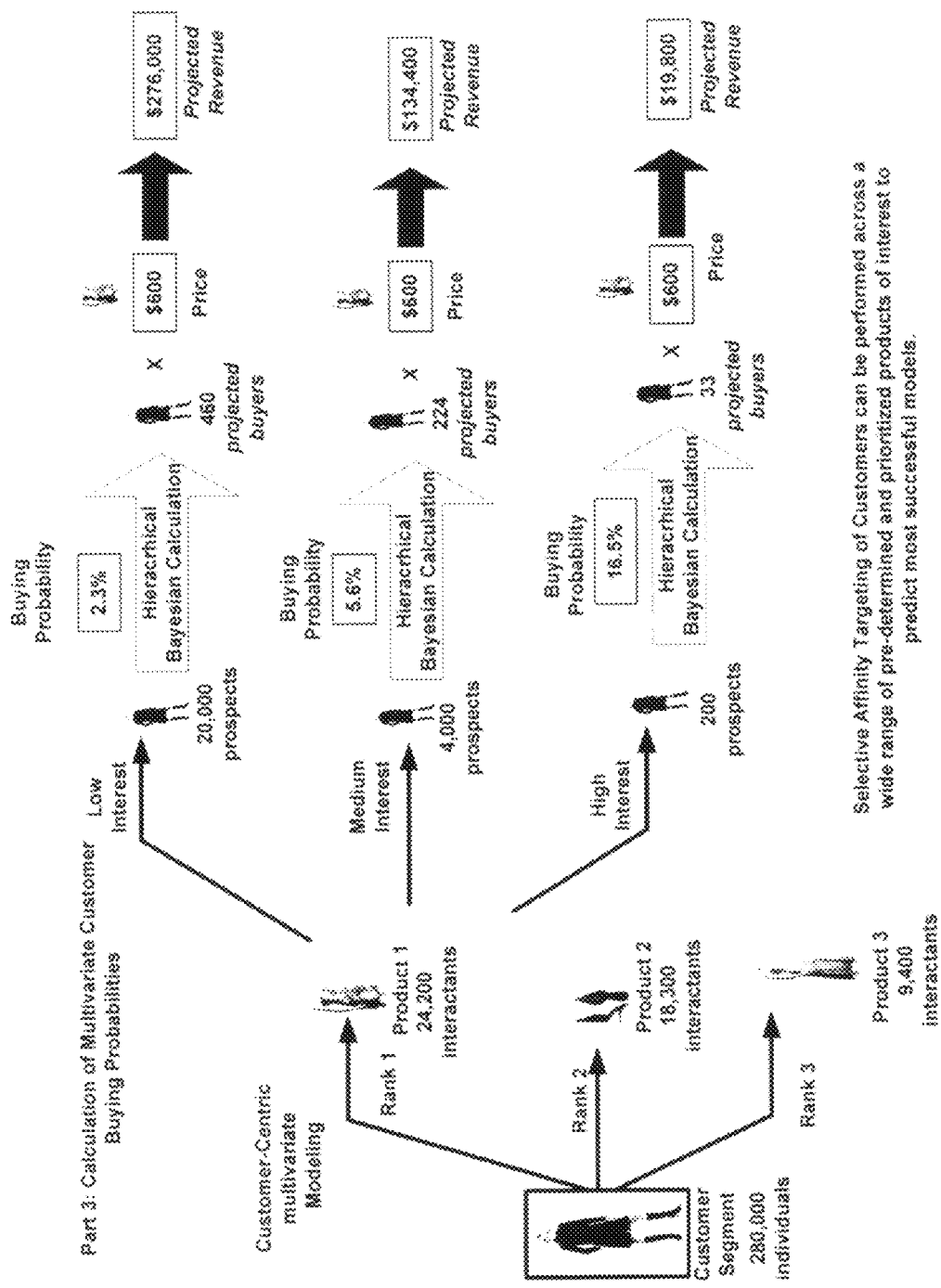
FIG. 27 further illustrates the customer-centric multivariate buying probabilities.

FIGS. 26 and 27 are a further illustration of an exemplary calculation of buying probabilities based on product-centric (FIG. 26) and customer-centric (FIG. 27) buying probabilities. In these calculations an interest score is derived for the product-customer interaction. In the product-centric model a population of potential customers is identified by interest for a particular product, an interest score calculates, a buying probability calculated and projected revenues calculated for the product. In the customer-centric model a customers preference for products may be modeled. For each product an interest score may be calculated, a probability of purchase calculated and projected revenues forecasted and an e-commerce report may be generated from these forecasts.

Figure 28:
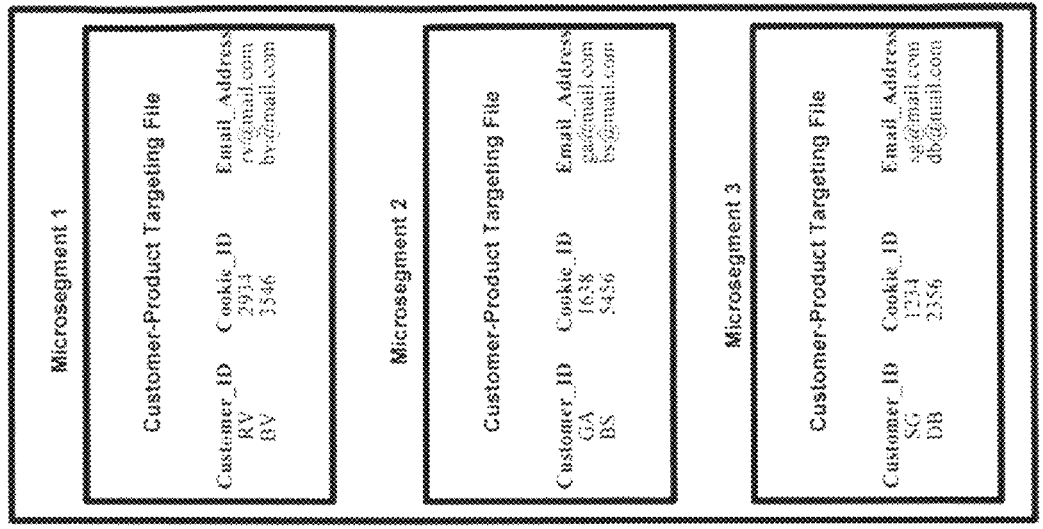
FIG. 28 is an illustration of generation of multivariate customer target lists consistent with one embodiment of the present invention.
Figure 28:
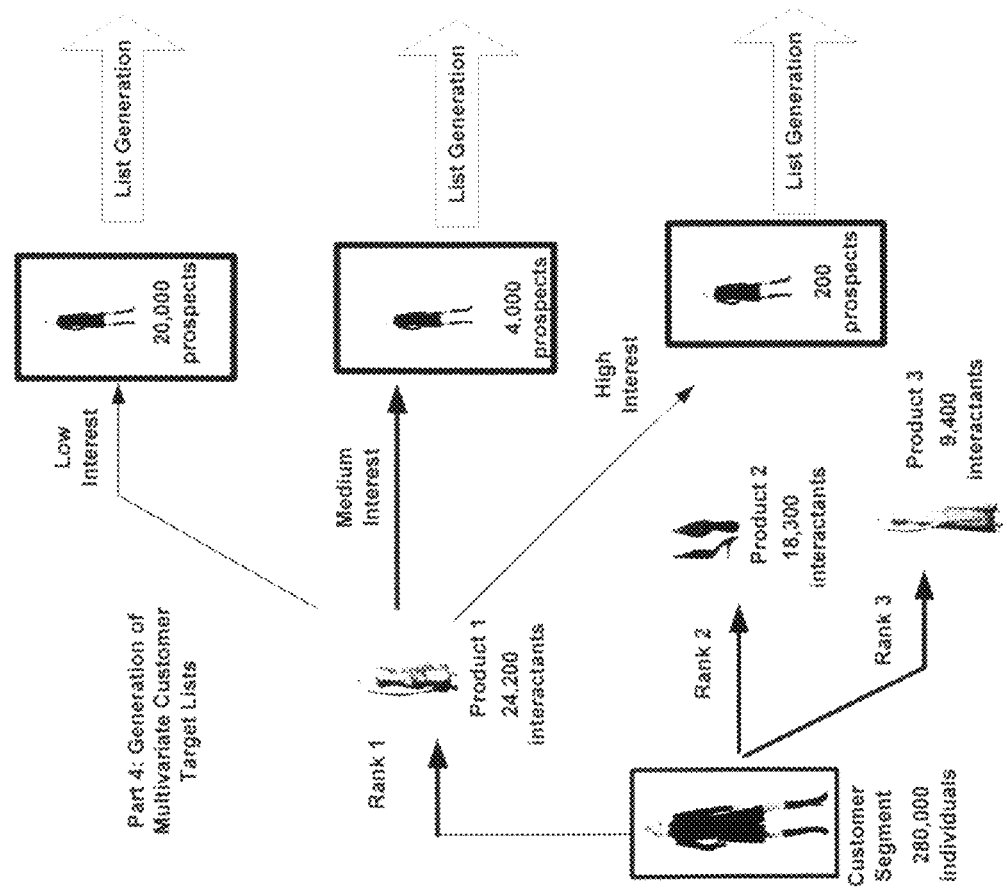

In one embodiment, illustrated in FIG. 28, an e-commerce report such as customer target lists may be generated based on product ranking, derived interest level. From these parameters advertising and marketing lists may be generated that target a customer with the highest probability of purchase with their item of most demonstrable interest.

One method provided includes the steps for implicitly scoring and classifying the interests and preferences of consumers in relation to various dimensions of items being offered (i.e., products, content, service packages, etc.) as function of time and utilizing such scores to predict purchasing activity and forecast revenue yield for n-dimensional combinations of interest for optimal generation of consumer lists for target marketing and merchandising. The method also includes converse modeling of the performance and behavioral profile of items offered as a function of consumer activity.

Source data has, for the purposes of this system, been classified into two categories: transactional data and dimensional data. The transactional data pertains to data generated by specific set of actions exhibited by a consumer within a specific context. In the case of the online store, transactional data pertains to actions exhibited by the consumer in relation to various items which would include, but not limited to, viewing, reading, searching, purchasing, or downloading. As is known in the art, there are various data base systems that attempt to store and process this data to yield value to the user.

Figure 29:
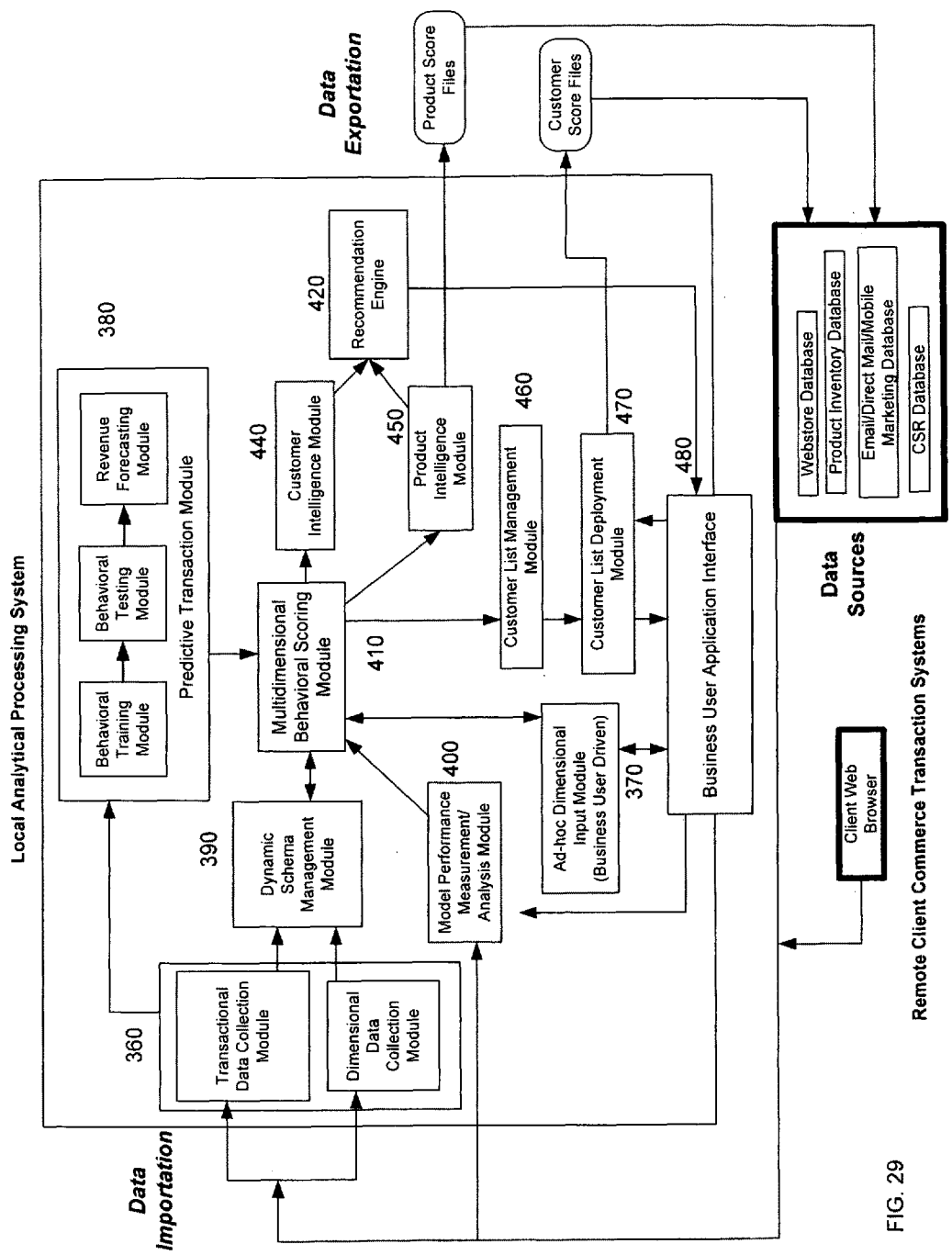
FIG. 29 is an illustration of a local analytical processing system consistent with one embodiment of the present invention.

In one embodiment of a provided system, illustrated in FIG. 29, data collection module 360 comprises a transactional data collection module and a dimensional data collection module. The two classes of data may be managed differently as they are often provided by different source systems at varying incremental update frequencies. The transactional data in some embodiments, may be automatically loaded and staged at a predetermined schedule by a designated module for downstream dimensional resolution and score assembly. In this embodiment, transactional data is sent to predictive transaction module 380 which, in some embodiments includes a behavioral training module, a behavioral testing module, and a revenue forecasting module. The transactional and dimensional data are further sent to dynamic schema management module 390.

Referential dimensional data of all entities involved in various transactional events (i.e., consumers, items, campaigns, dates, etc.) are also collected from various source systems and potentially transformed, like the transactional data described in the prior module, into schema management module 390. Dynamic schema management module 390 manages heterogeneous input data from varying client sources with different metadata and relational structures (i.e., product hierarchies/taxonomies, graphical models, ontologies, etc.) into a standard data model for selective processing. This standardized meta-construct allows for efficient multivariate processing to generate behavioral scores and buying probabilities for optimal customer lists generation for targeting per client user. This module appropriately selects the requisite data points from the source data as input variables for downstream calculations of behavioral scores and buying probabilities. This module is also designed to adaptively include additional transactional events as well as potentially new relational dimensions associated with them.

The Multidimensional behavioral scoring module 410 receives inputs from predictive transaction module 380, dynamic schema management module 390, and in some embodiments, model performance measurement analysis module 400. In an exemplary embodiment, it processes scores indicative of behavior for selected dimensions in two modalities: pre-compiled (materialized) processing or run-time processing. The calculation stream for each score processing modality is nearly equivalent, in some instances, except in the case of the pre-compiled processing where select dimensional combinations have been predetermined for scoring either by client specified rules or implicitly determined by the described system based on usage statistics.

The illustrated embodiment further includes an ad-hoc input module 370 which allows a business user to configure or manipulate system parameters through business user application interface 480 which may be a graphical user interface, such as a webpage or other interface.

The behavioral scores are generated by module 410 based on parametric user input of consumer, item, and time-based dimensions existent in the available data set via the business user application interface module 480. Such behavioral scores of consumers are calculated over specified time ranges in order to determine the optimal population of prospects that should be targeted with items or groups of items based on predicted buying probabilities and revenue yield. Such prospects are saved as lists of consumers with unique identifiers for particular item offerings and made available for targeted marketing and merchandising campaigns across various channels including email, direct mail, website, mobile, etc.

Targeting lists can be generated by two prevalent user paths. The first is a consumer-centric path, whereby the user performs a parametric selection of a specific customer segment and the system determines which items within the dataset for which there is most interest and associated likelihood of purchases and revenue yield. The user can specify the particular classes or categories of items for which they would like to find the interest of the consumer segment under consideration for targeting.

Conversely, the user can employ the other path for target list generation by first conducting a performing a parametric selection of a specific item or group of items and then determining the segment of consumers that would be most interested.

Once all scores have been calculated for a set of consumers for a specified time frame for a particular item or class of items, buying likelihoods are calculated for determinations of revenue yields. Such buying probabilities are generated by scoring a customer set in a time frame previous to the initial current period with the same set of parameters (training period) and then observing their buying behavior within the same historic time frame. These observations of differential buying activity represent the full set of joint distributions in the underlying Hierarchical Bayesian model used to calculate the posterior probabilities of purchasing behavior of specific set of customers for items.

Numerous trials may be performed including a test set in order to determine the predictive accuracy and reliability of the derived buying probabilities to assign to the current set of consumers which has been scored. Once the buying probabilities have been assigned, calculations are performed to determine the population of buyers and the concomitant revenue yield as a function of the item price.

In order to increase processing response time and list generation, behavioral score, buying probabilities, and revenue yield calculations are pre-compiled in an n-dimensional hypercube comprised of consumer, item, and temporal aggregate combinations. Such materialized aggregates can be generated for a select set of dimensions either predetermined by user specifications or dynamically by the system based on usage statistics.

In addition to allowing users to generate consumer and item lists for targeted marketing and merchandising based on multivariate determination of dimensions in their data set, an ad-hoc parametric input module is available to allow users to provide custom dimensional combinations (meta-dimensions) as criteria for analysis, segmentation, and targeting. Such dimensions are based on complex business logic and aggregates of already existent dimensions and can be calculated either in run-time or prior via materialized result sets.

This specialized user input module illustrated within module 370, increases the targeting capacity and revenue lift performance of the system as it allows for heuristic augmentation and information gain with the inclusion of user-determined dimensional inputs.

Once the user selects the customer list to be generated, the consumers within the list as well as the associated metadata of both the target and treatment components is managed by the customer list management module 460. Lists and their metadata can be either saved by the user for future use or exported to external client systems for immediate use. If the list is saved, both the list of customers and the metadata of the list regarding the item treatment can be reused to generate new variant campaigns. Both versions of reuse is time sensitive yielding potentially different list membership profile, population size, as well as different array of items to be offered.

When lists are made available for export to external systems specified by the user, they are delivered by the customer list deployment module 470. In cases where multiple consumer lists are deployed within a similar time frame, a list membership duplication resolution process is conducted in order to minimize unwanted communication saturation to target consumers. Unlike other technologies which may perform removal of duplicates based on arbitrary de-selection criteria, the described system performs optimal list membership assignment based on interest scores and buying probabilities calculated by the system.

In addition to scoring of consumer interests to particular items based on point-in-time user parametric modeling, the system also performs heuristics on historical behavioral trends. In the case of the customer intelligence module 440, new scores and indexes are calculated that measure the rate and acceleration of particular behavioral nuances of consumers in relation to products.

A converse set of behavioral trend scores are also generated in the product intelligence module 450 for various item classes in order to identify emerging trends for improved targeted merchandising to amenable consumer segments.

Intelligence from both modules can be summarized into a separate reporting service that can provide insight into behavior-driven, micro-markets for various domains.

Additionally, correlations between behavioral trend scores of all dimensions being modeled (i.e., consumers, items, etc.) serve as the premise for the generation for rule set for the target campaign recommendation module. Such a module allows for undirected analysis and discovery of candidates for high-performing lists for target marketing and merchandising campaigns. The criteria for recommendation by this module can be driven by user stringency thresholds or managed dynamically by heuristics of projected and actual list performance metrics.

Designed as a closed-loop heuristic system for continuous and adaptive learning, the model performance analysis module 400 provides metrics for the comparative lift performance analysis for the user. In addition, the module actively analyzes the performance of models which have been generated and utilized for live campaigns in order to refine the selection and use of various input variables and drive the discovery of new candidate variables to improve performance.

Figure 31:
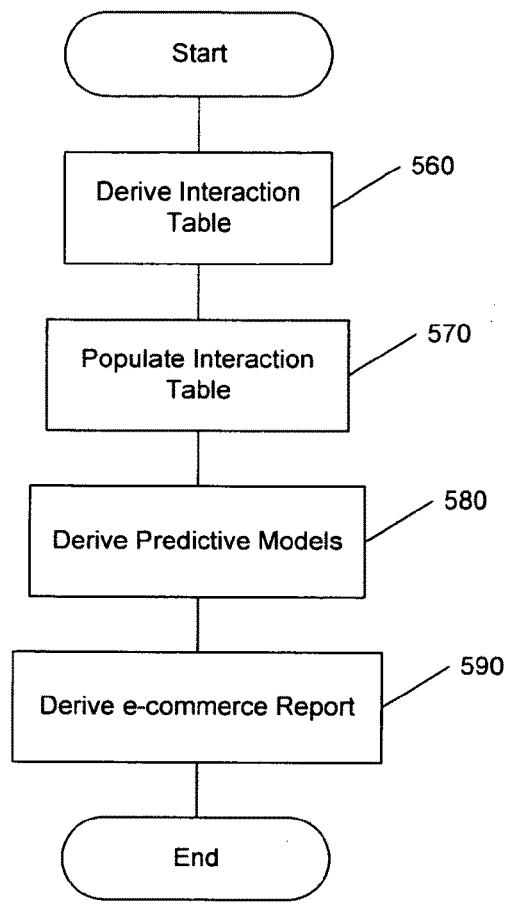
FIG. 31 illustrates a method consistent with provided embodiments.

One embodiment of a provided method is illustrated in FIG. 31. In this embodiment, flow begins in block 560 where a multi-dimensional, multi-resolutional, de-normalized interaction table is derived. Flow continues to block 570 where the interaction table is populated with a plurality of information. Exemplary information includes information on products at varying resolutions, information on potential customers, and information on events at various times. Flow continues to block 580 where predictive models are derived. Flow continues to block 590 where an e-commerce report is derived from these models.

Figure 32:
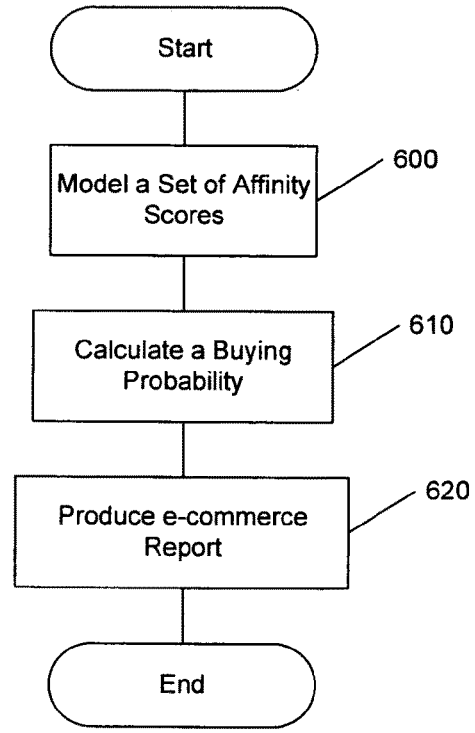
FIG. 32 illustrates another method consistent with provided embodiments.

Another exemplary embodiment of a method is illustrated in FIG. 32. In this method, flow begins at block 600 where a set of affinity scores are modeled from a set of information. The information including information on products at various resolutions, information on potential customers, and information on events at different times. Flow continues to block 610 where buying probabilities are calculated. Flow then continues to block 620 where an e-commerce report is produced.

Figure 33:
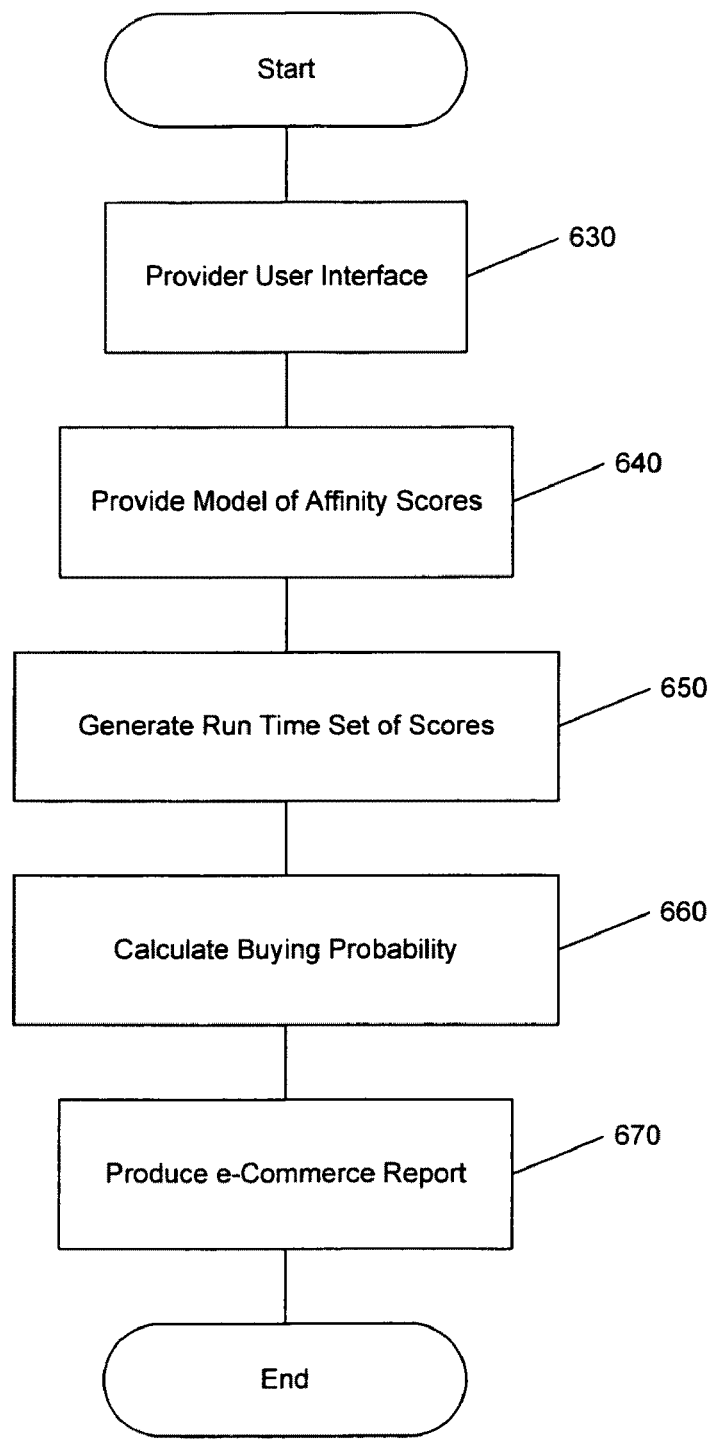
FIG. 33 illustrates another method consistent with provided embodiments.

An embodiment of another provided method is illustrated in FIG. 33. In this embodiment, flow begins in block 630 where a user interface is provided, the user interface configured to allow a user to interact in such a way to customize e-commerce reports. Flow continues to block 640 where a model of an aggregate set of affinity scores is provided. Flow then continues to block 650 where a set of run-time affinity scores are generated. In some embodiments, the run time set of affinity scores are derived, or extrapolated from, the aggregate set. Flow then continues to block 660 where a buying probability is calculated from the run time set of affinity scores. Flow continues to block 670 where an e-commerce report is generated. In this, as in other described embodiments, the e-commerce report may include but is not limited to an advertising campaign, a revenue forecast report, an inventory predication report, a supply chain report, a product pricing report, a product demand report, a customer-centric product affinity report, and a product-centric product infinity report.

Figure 30:
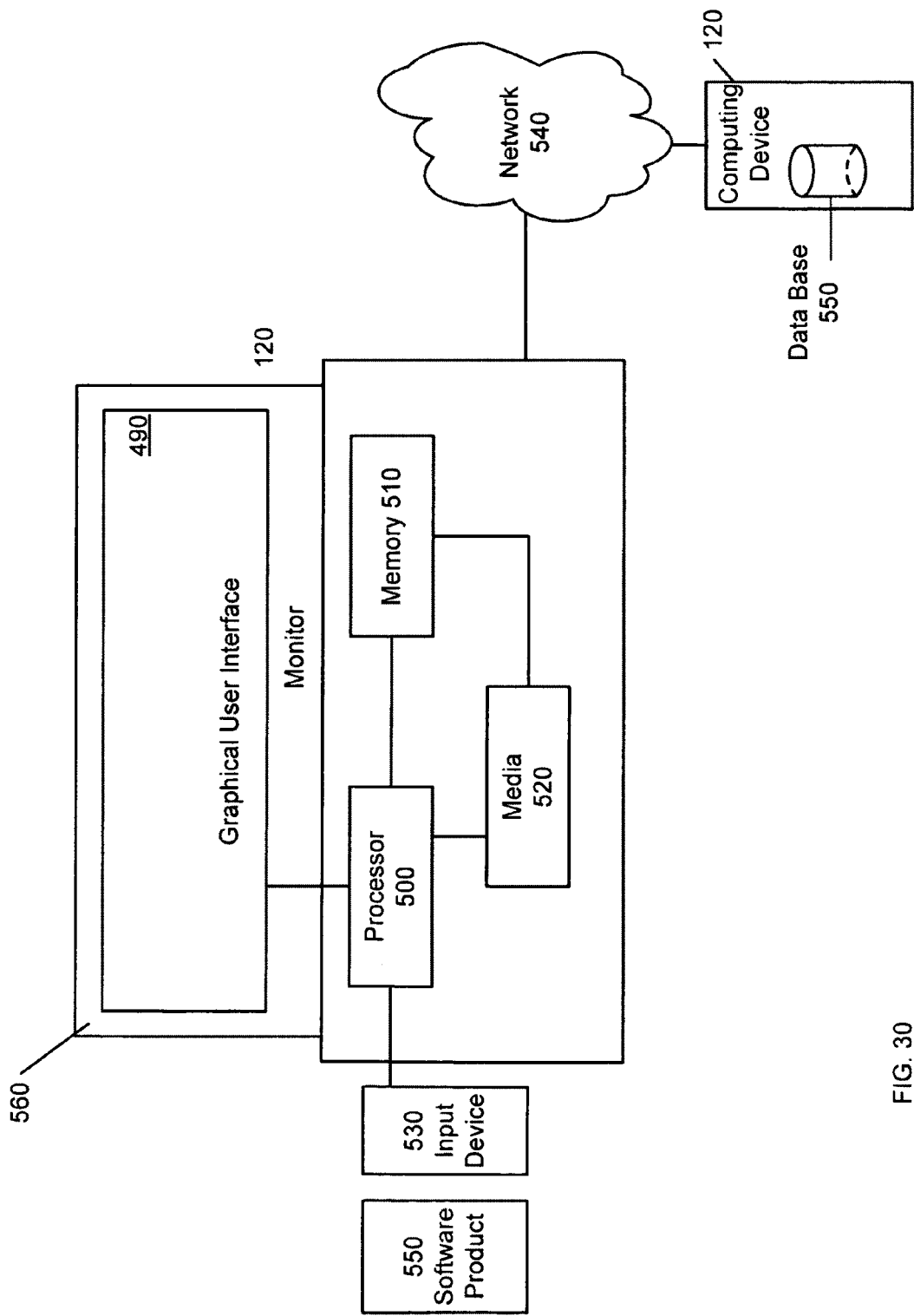
FIG. 30 illustrates a computing device and software product consistent with various provided embodiments.

Embodiments of provided computing apparatus 120 and computer software product 550 are illustrated in FIG. 30. Computing device 120 includes processor 500, memory 510, storage media 520, input device 530, and monitor 560. As is known in the art additional components are necessary to make computing devices functional or additionally useful. These additional components are omitted for convenience. In various embodiment, media 520 contains a set of processor executable instructions that, when executed by processor 500 configure computing device 120 to execute the methods herein described to produce e-commerce reports. In some embodiments, computing device 120 may be connected to network 540 and communicating with other computing devices so connected. A embodiment of computer software product 550 is further illustrated in FIG. 30. Computer software product comprises a computer readable media embedded with a set of processor executable instructions that, when executed by processor 500 configure computing device 120 to execute the methods herein described and produce e-commerce reports. In an alternate embodiment, the machine readable media may be located in another computing device 120 across network 540. In this embodiment processor executable instructions may be stored on database 550. These processor executable instructions sufficient, when executed by processor 500, to configure computing device 120 to execute the methods described herein and generate e-commerce reports.

Thus, it is seen that a system and methods for analytical processing and determining customer interests are provided. One skilled in the art will appreciate that the present invention can be practiced by other than the above-described embodiments, which are presented in this description for purposes of illustration and not of limitation. The specification and drawings are not intended to limit the exclusionary scope of this patent document. It is noted that various equivalents for the particular embodiments discussed in this description may practice the invention as well. That is, while the present invention has been described in conjunction with specific embodiments, it is evident that many alternatives, modifications, permutations and variations will become apparent to those of ordinary skill in the art in light of the foregoing description. Accordingly, it is intended that the present invention embrace all such alternatives, modifications and variations as fall within the scope of the appended claims. The fact that a product, process or method exhibits differences from one or more of the above-described exemplary embodiments does not mean that the product or process is outside the scope (literal scope and/or other legally-recognized scope) of the following claims.

What is claimed is:

1. A computer-implemented method of producing a e-commerce report comprising:
   deriving, using a computing apparatus, a multi-dimensional, multi-resolution, de-normalized interaction table;
   populating, using the computing apparatus, the interaction table with a plurality of information, the plurality of information comprising: information on products at varying resolutions, information on potential customers, and information on events at various times;
   deriving e-commerce consumer and merchandise predictive behavioral models from the interaction table; and
   deriving an e-commerce report from the models, wherein the report comprises projected revenue and is accessible to a user via the computing apparatus.

2. The method of claim 1, wherein the information on products at varying resolutions comprises information selected from a group consisting of: a product attribute map, a product entity, a stock keeping unit attribute map and a stock keeping unit entity.

3. The method of claim 2, wherein the product attribute map comprises an attribute identification, and an attribute name and wherein the product entity comprises a product identification, an attribute identification and an attribute value.

4. The method of claim 1, wherein the information on potential customers comprises information selected from a group consisting of a customer attribute map and a customer entity.

5. The method of claim 4, wherein the customer attribute map comprises an attribute identification and a attribute name, and wherein the customer entity comprises a customer identification an attribute identification, and an attribute value.

6. The method of claim 1, wherein the information on events is derived from clickstream data.

7. The method of claim 1, wherein the information on events comprises information selected from a group consisting of a product view event, a cart insert event, and an order data event.

8. The method of claim 1, wherein the interaction table further comprises a date associated with an event.

9. A computing apparatus comprising:
   a processor;
   a memory;
   a storage medium, wherein the storage medium contains processor executable instructions that, when executed by the processor configure the computing apparatus to:
   derive a multi-dimensional, multi-resolution, de-normalized interaction table;
   populate the interaction table with a plurality of information, the plurality of information comprising: information on products at varying resolutions, information on potential customers, and information on events at various times;
   derive e-commerce consumer and merchandise predictive behavioral models from the interaction table; and
   derive an e-commerce report from the models, wherein the report comprises projected revenue.

10. The computing apparatus of claim 9, wherein the information on products at varying resolutions comprises information selected from a group consisting of: a product attribute map, a product entity, a stock keeping unit attribute map and a stock keeping unit entity.

11. The computing apparatus of claim 10, wherein the product attribute map comprises an attribute identification, and an attribute name and wherein the product entity comprises a product identification, an attribute identification and an attribute value.

12. The computing apparatus of claim 9, wherein the information on potential customers comprises information selected from a group consisting of a customer attribute map and a customer entity.

13. The computing apparatus of claim 12, wherein the customer attribute map comprises an attribute identification and a attribute name, and wherein the customer entity comprises a customer identification an attribute identification, and an attribute value.

14. The computing apparatus of claim 9, wherein the information on events is derived from clickstream data.

15. The computing apparatus of claim 9, wherein the information on events comprises information selected from a group consisting of a product view event, a cart insert event, and an order data event.

16. The computing apparatus of claim 9, wherein the interaction table further comprises a date associated with an event.

17. A computer software product comprising:
   a storage medium, wherein the storage medium contains processor executable instructions that, when executed by a processor configure a computing apparatus to:
   derive a multi-dimensional, multi-resolution, de-normalized interaction table;

populate the interaction table with a plurality of information, the plurality of information comprising: information on products at varying resolutions, information on potential customers, and information on events at various times;
derive e-commerce consumer and merchandise predictive behavioral models from the interaction table; and
derive an e-commerce report from the models, wherein the report comprises projected revenue.

18. The computer software product of claim 17, wherein the information on products at varying resolutions comprises information selected from a group consisting of: a product attribute map, a product entity, a stock keeping unit attribute map and a stock keeping unit entity.

19. The computer software product of claim 18, wherein the product attribute map comprises an attribute identification, and an attribute name and wherein the product entity comprises a product identification, an attribute identification and an attribute value.

20. The computer software product of claim 17, wherein the information on potential customers comprises information selected from a group consisting of a customer attribute map and a customer entity.

21. The computer software product of claim 20, wherein the customer attribute map comprises an attribute identification and a attribute name, and wherein the customer entity comprises a customer identification, an attribute identification, and an attribute value.

22. The computer software product of claim 17, wherein the information on events is derived from clickstream data.

23. The computer software product of claim 17, wherein the information on events comprises information selected from a group consisting of a product view event, a cart insert event, and an order data event.

24. The computer software product of claim 17, wherein the interaction table further comprises a date associated with an event.

25. The computer software product of claim 17, wherein the storage medium is located on an apparatus on a network remote from the computing apparatus.

* * * * *